United States Patent [19]
Yamamoto et al.

[11] Patent Number: 5,168,024
[45] Date of Patent: Dec. 1, 1992

[54] INORGANIC-ORGANIC OR SEMICONDUCTIVE INORGANIC-ORGANIC COMPOSITE MATERIAL, PRODUCTION PROCESS THEREOF, AND ELECTROPHOTOGRAPHIC PHOTORECEPTOR USING THE COMPOSITE MATERIAL

[75] Inventors: Kohichi Yamamoto; Shigetoshi Nakamura, both of Kanagawa, Japan

[73] Assignee: Fuji Xerox Corporation, Ltd., Tokyo, Japan

[21] Appl. No.: 501,841

[22] Filed: Mar. 30, 1990

[30] Foreign Application Priority Data

| Mar. 31, 1989 | [JP] | Japan | 1-78529 |
| Mar. 31, 1989 | [JP] | Japan | 1-78530 |
| Mar. 31, 1989 | [JP] | Japan | 1-78531 |
| Mar. 31, 1989 | [JP] | Japan | 1-78532 |
| Mar. 31, 1989 | [JP] | Japan | 1-78533 |
| Mar. 31, 1989 | [JP] | Japan | 1-78534 |

[51] Int. Cl.$^5$ ............................................ G03G 5/047
[52] U.S. Cl. ...................................... 430/58; 428/701
[58] Field of Search .............. 430/58, 59; 525/328.2; 428/701

[56] References Cited

U.S. PATENT DOCUMENTS

| 4,902,570 | 2/1990 | Heinemann et al. | 430/110 |
| 4,948,843 | 8/1990 | Roberts et al. | 525/377 |

FOREIGN PATENT DOCUMENTS

| 57-4051 | 1/1982 | Japan . |
| 58-125434 | 7/1983 | Japan . |
| 60-51622 | 3/1985 | Japan . |
| 61-163124 | 7/1986 | Japan . |
| 61-163128 | 7/1986 | Japan . |
| 62-100428 | 5/1987 | Japan . |
| 62-143880 | 6/1987 | Japan . |
| 62-143881 | 6/1987 | Japan . |
| 63-2618 | 1/1988 | Japan . |
| 63-123838 | 5/1988 | Japan . |

Primary Examiner—John Goodrow
Attorney, Agent, or Firm—Finnegan, Henderson, Farabow, Garrett and Dunner

[57] ABSTRACT

According to this invention, there is provided an inorganic-organic or semiconductive inorganic-organic composite material formed by polycondensing a metal alkoxide in the presence of an organic compound by a sol-gel process.

According to other embodiment of this invention, there is provided a process for producing an inorganic-organic or semiconductive inorganic-organic composite material formed by polycondensing a metal alkoxide in the presence of an organic compound by a sol-gel process, which comprises adding to a sol solution of at least one metal alkoxide.

Furthermore, according to another embodiment of this invention, there is also provided an electrophotographic photoreceptor comprising a conductive support having formed thereon a charge generating layer and a charge transporting layer, wherein the charge transporting layer comprises a matrix formed by polycondensing at least one metal alkoxide and an organic compound as a charge transporting agent having an affinity with the metal alkoxide.

9 Claims, 4 Drawing Sheets

INORGANIC-ORGANIC OR SEMICONDUCTIVE INORGANIC-ORGANIC COMPOSITE MATERIAL, PRODUCTION PROCESS THEREOF, AND ELECTROPHOTOGRAPHIC PHOTORECEPTOR USING THE COMPOSITE MATERIAL

FIELD OF THE INVENTION

This invention relates to an inorganic-organic composite material obtained by a sol-gel process, a process for producing the composite material, and also to an electrophotographic photoreceptor using the inorganic-organic composite material for charge transporting agent.

BACKGROUND OF THE INVENTION

Hitherto, as a semiconductive materials, so-called various compound semiconductors mainly composed of Si or Ge have been known. On the other hand, it is known that a certain kind of metal oxide shows a semiconductivity. However, since these materials are generally prepared by a dry film-forming process, it is difficult to obtain a device having a large area and also the cost for thereof is high.

On the other hand, recently, semiconductive materials comprising organic material have actively developed and have been practically used in some field. In particular, an organic electrophotographic photoreceptor giving an excellent result has been obtained using a macromolecular polymer doped with a low molecular weight compound such as a transporting agent.

A semiconductive material composed of an organic material has many advantages that a semiconductor having a large area can be easily produced, the cost thereof is low, etc. However, such an organic semiconductive material has disadvantages that the semiconductivity is liable to be influenced by moisture absorbed therein and impurity ions existing in a macromolecular polymer, and the semiconductive material is inferior in weather resistance, hardness, and abrasion resistance.

Also, recently, a process of producing metal oxide semiconductors by a sol-gel process is proposed and it becomes possible to obtain a device having a large area at a low cost. However, the metal oxide showing semiconductivity produced by such a process difficultly forms a uniform film and, on the contrary, a metal oxide capable of easily forming a uniform film produced by the process shows an electrically insulating property.

On the other hand, it is proposed in *Journal of Applied Physics*, 58, 9, 1, p. 3559 (1985) to obtain a semiconductive material by doping a metal oxide capable of forming a uniform film with an organic molecule, but in this case, as the organic molecule being used for doping, an alcohol-soluble or water soluble organic compound only can be used and hence the application thereof is limited to a narrow field of art.

A sol-gel process is a process of hydrolyzing a metal alkoxide at normal temperature to form a sol and after proceeding the reaction for gelling the sol, calcining the gel at low temperature, and various proposals have been made for forming functional materials having various functions using the conventional sol-gel process.

For example, there are a process of producing a composite oxide mixing a metal alkoxide having two or more kinds of metal oxides as described in JP-A-58-25434, JP-A-61-163128, and JP-A-63-123838 (the "term" as used herein means an "unexamined published Japanese patent application"), and *Kagaku Kougyou (Chemical Industry)*, 12, 1007 (1986), a process of adding a metal ion or a metal salt to an alcohol solution or an aqueous solution of a metal alkoxide as described in JP-A-60-51622, JP-A-62-143880, and JP-A-62-143881, a process of adding a fine powder or microcapsules to an alcohol solution or an aqueous solution of a metal oxide as described in JP-A-62-100428 and JP-A-63-2618, and a process of forming a dry gel and then impregnating the gel with a solution containing a metal ion, etc., as described in JP-A-60-51622 and JP-A-61-163124.

Furthermore, on materials being used for doping the use of organic compounds has been also investigated in place of using metal compounds as described in *J. Appl. Phys*, 58, 9, 1, p. 3559 (1985), *J. Non. Cryst. Solid*, 82, p. 103 (1986), and *J. Phys. Chem.*, 88, p. 5956 (1984).

However, in these processes described above, alcohol-soluble or water-soluble materials only can be used as the doping materials and other more useful functional materials than the aforesaid materials can not be used as the doping materials.

Also, electrophotographic photoreceptors using organic photoconductors have been variously investigated owing to the advantages thereof that they cause no pollution, they can be produced with high producibility and they can be produced at low cost. However, organic photoconductors have such disadvantages that the organic photoconductor generating electric charges by adsorbing visible light is poor in charge retentivity, while the organic photoconductor having good charge retentivity and excellent film-forming property generally scarecely shows photoconductivity by visible light.

For solving the problem, it has been practiced to employ a double layer type photoconductive (photosensitive) layer having a layer structure of separating each function into a charge generating layer of generating electric charges by absorbing visible light and a charge transporting layer of transporting the charges, and also with respect to the charge generating agents (or materials) and charge transporting agents (or materials), various materials have been proposed. For example, as charge transporting agents, there are known various materials such as amine compounds, hydrazone compounds, pyrazoline compounds, oxazole compounds, oxadiazole compounds, stilbene compounds, carbazole compounds, etc.

Hitherto, as a binder resin for the charge transporting layer, high molecular resins such as polymethyl methacrylate, polyester, polycarbonate, etc., as disclosed in JP-A-57-4051 are generally used.

These high molecular resins show good compatibility with various charge transporting agents and give good electrostatic characteristics but are weak to external mechanical forces owing to the low hardness, which results in restraining the life of the electrophotographic photoreceptor using such a binder resin because of the formation of su face abrasion and scratches.

On the other hand, recently, a process of forming a functional film by doping an organic compound in the case of synthesizing a metal oxide ceramic using a metal alkoxide by a sol-gel process has been proposed and the film formed by the aforesaid process has a high hardness and has an excellent abrasion resistance.

However, in the case of applying the film formed using the metal alkoxide by a sol-gel process, there is a problem that the obtained film has a high hardness and an excellent abrasion resistance but a charge transporting material is not compatible with the layer and a charge transferring function can not be imparted to the film, if the film is applied to the electrophotographic photoreceptor. Thus, the film can not be utilizing as a materials for forming a charge transporting layer of an electrophotographic photoreceptor.

SUMMARY OF THE INVENTION

This invention has been made under the aforesaid circumstances.

An object of this invention is, therefore, to provide an inorganic-organic or semiconductive inorganic-organic composite material stably containing an organic compound prepared by a sol gel process.

Other object of this invention is to provide a process of producing an inorganic-organic or semiconductive inorganic-organic composite material containing an organic compound stably dispersed therein by a sol-gel process.

A still other object of this invention is to provide an electrophotographic photoreceptor having a charge transporting layer having a high hardness and an excellent abrasion resistance, said charge transporting layer being formed using the aforesaid inorganic-organic composite material.

As the result of various investigations, the present inventors have discovered that by substituting a part of the alkoxy group of a metal alkoxide with a hydrophobic substituent having an affinity with an organic compound for dispersing the metal alkoxide, the hydrophobic substituents aggregate in a micell form to form a gel material, which has an affinity with the organic compound molecule and becomes compatible with various organic compounds. Furthermore, it has been discovered that by selecting the organic compound being used, the conductivity of the metal oxide can be desirably controlled.

The present inventors have succeeded in attaining the present invention as set forth hereinbelow based on the aforesaid discoveries.

Thus, according to this invention, there is provided an inorganic-organic or semiconductive inorganic-organic composite material formed by polycondensing a metal alkoxide in the presence of an organic compound by a sol-gel process, wherein the metal alkoxide is at least one metal alkoxide selected from a group of metal alkoxides represented by formulae (Ia), (IIa), and (IIIa) or a group or metal alkoxides represented by formulae (Ib), (IIb), and (IIIb), and the organic compound has an affinity with $X_1$ or $X_2$ contained in the metal alkoxides;

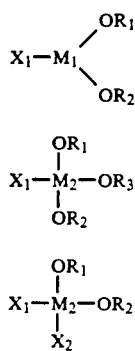

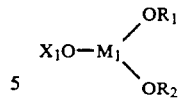

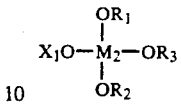

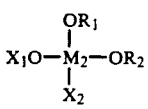

wherein $M_1$ represents a trivalent metal atom; $M_2$ represents a tetravelent metal atom or a carbon atom; $R_1$, $R_2$, and $R_3$ each represents a hydrogen atom or an alkyl group having from 1 to 6 carbon atom, provided that at least one of $R_1$, $R_2$, and $R_3$ represents an alkyl group having from 1 to 6 carbon atoms; and $X_1$ and $X_2$ each represents an alkyl group having at least 5 carbon atoms, an aryl group, an aralkyl group, an acyl group, a heterocyclic group, or unsaturated hydrocarbon group, each group may have a substituent, or the $X_1$ and $X_2$ represent groups which are combined with each other to form a ring structure.

According to other embodiment of this invention, there is provided a process for producing an inorganic-organic or semiconductive inorganic-organic composite material formed by polycondensing a metal alkoxide in the presence of an organic compound by a sol-gel process, which comprises adding to a sol solution of at least one metal alkoxide selected from a group of metal alkoxides represented by the aforesaid formulae (Ia), (IIa), and (IIIa) or a group of metal alkoxides represented by the aforesaid formulae (Ib), (IIb), and (IIIb) an organic compound having an affinity with $X_1$ or $X_2$ contained in the metal alkoxide.

Furthermore, according to another embodiment of this invention, there is also provided an electrophotographic photoreceptor comprising a conductive support having formed thereon a charge generating layer and a charge transporting layer, wherein the charge transporting layer comprises a matrix formed by polycondensing at least one metal alkoxide selected from a group of metal alkoxides represented by the aforesaid formula (Ia), (IIa), and (IIIa) or a group of metal alkoxides represented by the aforesaid formulae (Ib), (IIb) and (IIIb), and an organic compound as a charge transporting agent having an affinity with $X_1$ or $X_2$ contained in the metal alkoxide.

DETAILED DESCRIPTION OF THE INVENTION

Figure 1A:
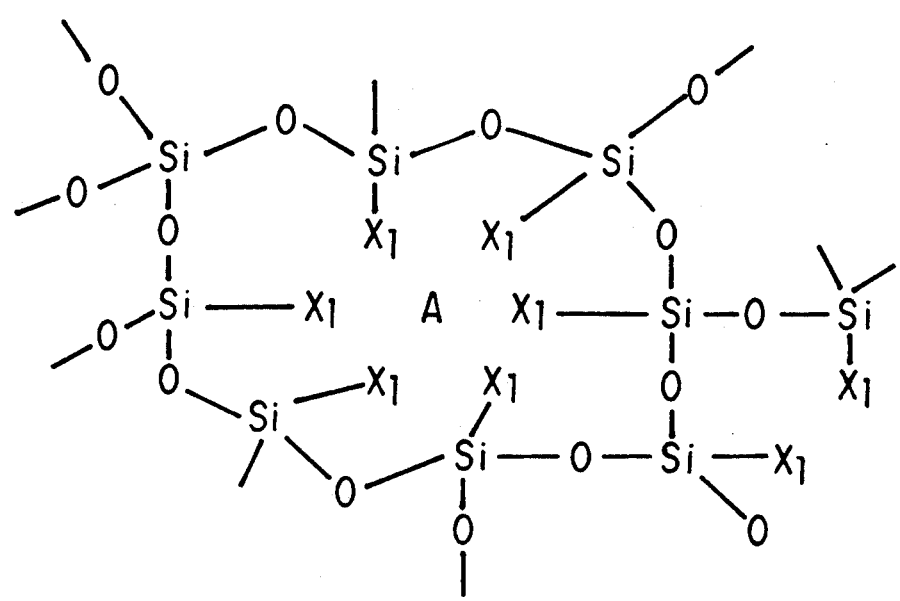
FIGS. 1-a and 1-b are schematic views each showing a model of the structure of the inorganic-organic or semiconductive inorganic-organic composite material (charge transporting layer) of this invention.

Then, this invention is explained in detail.

In this invention, it is preferred that the metal alkoxide which is used for the inorganic-organic or semiconductive inorganic-organic composite material of this invention is a mixture of at least one metal alkoxide selected from a group of the metal alkoxides represented by the aforesaid formulae (Ia), (IIa), and (IIIa) or a group of the metal alkoxides represented by the aforesaid formulae (Ib), (IIb), and (IIIb) and at least one metal alkoxide selected from a group of metal alkoxides represented by formulae (IV) and (V);

$$R_4O-M_3\begin{matrix}OR_5\\ \\Y\end{matrix} \quad (IV)$$

$$R_4O-\underset{\underset{OR_6}{|}}{\overset{\overset{OR_5}{|}}{M_4}}-Y \quad (V)$$

wherein $M_3$ represents a trivalent metal atom; $M_4$ represents a tetravalent metal atom or a carbon atom; $R_4$, $R_5$, and $R_6$ each represents a hydrogen atom or an alkyl group having from 1 to 4 carbon atoms; and Y represents a hydroxy group, an alkoxy group having from 1 to 4 carbon atoms, a halogen atom, an amino group, an alkyl group having from 1 to 4 carbon atoms, which may have a substituent, an aryl group which may have a substituent, an acyl group, a heterocyclic group, or an unsaturated hydrocarbon group.

Also, in the aforesaid production process of this invention, it is preferred that the sol solution contains at least one metal alkoxide selected from a group of the metal alkoxides represented by the aforesaid formulae (Ia), (IIa), and (IIIa) or a group of the metal alkoxides represented by the aforesaid formulae (Ib), (IIb), and (IIIb) and at least one metal alkoxide selected from the metal alkoxides represented by the aforesaid formulae (IV) and (V).

Furthermore, in the electrophotographic photoreceptor of this invention, it is preferred that the charge transporting layer comprises a matrix formed by polycondensing a mixture of at least one metal alkoxide selected from a group of the metal alkoxides represented by the aforesaid formulae (Ia), (IIa), and (IIIa) or a group of the alkoxides represented by the aforesaid metal alkoxides represented by the aforesaid formulae (Ib), (IIb), and (IIIb) and at least one metal alkoxides selected from a group of the alkoxides represented by the aforesaid formulae (IV) and (V), and an organic compound for a charge transporting agent having an affinity with $X_1$ or $X_2$ contained in the metal alkoxide in the former two groups.

In addition, the term "metal alkoxide" used in this specification is defined to also mean the case that $M_2$ in the aforesaid formulae (IIa), (IIIa), (IIb) and (IIIb) and $M_4$ in the aforesaid formula (V) each represents a carbon atom.

The metal atom of the metal alkoxides in the aforesaid formulae (Ia) to (IIIa), (Ib) to (IIIb), (IV), and (V), which are used as raw materials in this invention is preferably selected from Al, B, Ga, Y, Fe, Si, Ge, Sn, Ti, and Zr. Particularly Al, Si, Ge, Sn, Ti and Zr are preferred.

Specific examples of the metal alkoxides which can be suitably used for the production of the inorganic-organic or semoductive inorganic-organic composite materials of this invention are illustrated below.

That is, specific examples of the metal alkoxide shown by the aforesaid formula (Ia) are as follows:

$C_5H_{11}-Al(OCH_3)_2$, $C_6H_{13}-Al(OCH_3)_2$
$C_7H_{15}-Al(OCH_3)_2$, $C_8H_{17}-Al(OCH_3)_2$
$C_9H_{19}-Al(OCH_3)_2$, $C_{10}H_{21}-Al(OCH_3)_2$
$C_{15}H_{31}-Al(OCH_3)_2$, $C_{20}H_{41}-Al(OCH_3)_2$
$C_{25}H_{51}-Al(OCH_3)_2$, $C_{10}H_{21}-Al(OC_2H_5)_2$
$C_{20}H_{41}-Al(OC_2H_5)_2$, $C_{25}H_{51}-Al(OC_2H_5)_2$
$C_{10}H_{21}-Al(OC_3H_7)_2$, $C_{10}H_{21}-Al(OC_4H_9)_2$

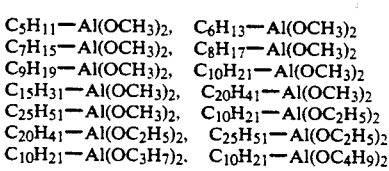

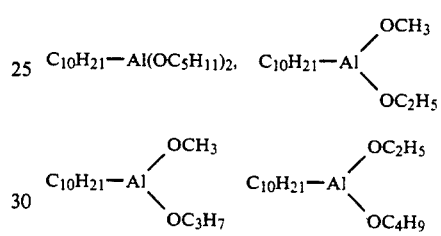

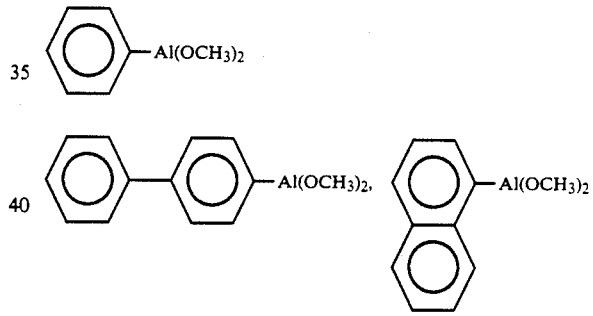

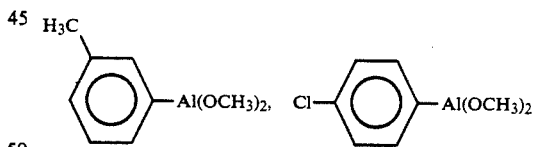

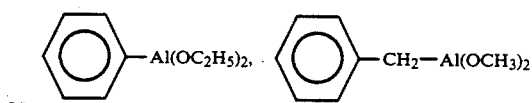

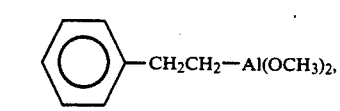

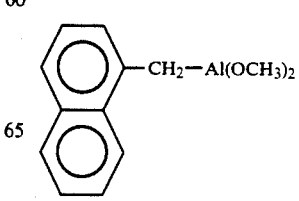

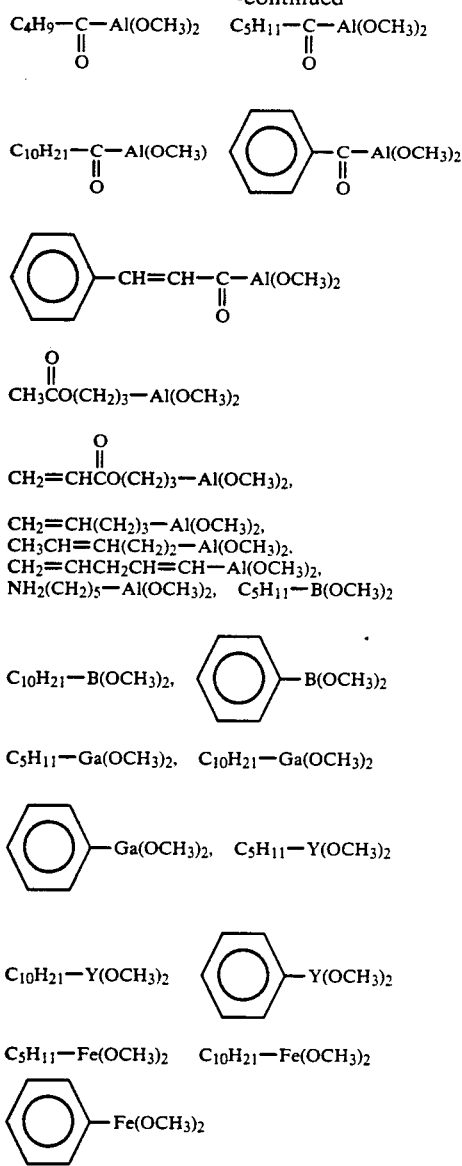

$C_4H_9-\underset{\underset{O}{\|}}{C}-Al(OCH_3)_2$  $C_5H_{11}-\underset{\underset{O}{\|}}{C}-Al(OCH_3)_2$ $C_{10}H_{21}-\underset{\underset{O}{\|}}{C}-Al(OCH_3)$ $CH_3\overset{\overset{O}{\|}}{C}O(CH_2)_3-Al(OCH_3)_2$ $CH_2=CH\overset{\overset{O}{\|}}{C}O(CH_2)_3-Al(OCH_3)_2,$ $CH_2=CH(CH_2)_3-Al(OCH_3)_2,$
$CH_3CH=CH(CH_2)_2-Al(OCH_3)_2,$
$CH_2=CHCH_2CH=CH-Al(OCH_3)_2,$
$NH_2(CH_2)_5-Al(OCH_3)_2,$  $C_5H_{11}-B(OCH_3)_2$ $C_{10}H_{21}-B(OCH_3)_2,$ $C_5H_{11}-Ga(OCH_3)_2,$  $C_{10}H_{21}-Ga(OCH_3)_2$ $C_{10}H_{21}-Y(OCH_3)_2$ $C_5H_{11}-Fe(OCH_3)_2$  $C_{10}H_{21}-Fe(OCH_3)_2$ Specific examples of the metal alkoxide shown by the aforesaid formula (IIa) are as follows:

$C_5H_{11}-Si(OCH_3)_3$  $C_{10}H_{21}-Si(OCH_3)_3$
$C_{15}H_{31}-Si(OCH_3)_3$  $C_{20}H_{41}-Si(OCH_3)_3$
$C_5H_{11}-Si(OC_2H_5)_3$  $C_{20}H_{41}-Si(OC_2H_5)_3$
$C_{20}H_{41}-Si(OC_3H_7)_3$  $C_{20}H_{41}-Si(OC_4H_9)_3$ $C_{20}H_{41}-Si(OC_5H_{11})_3$  $C_{20}H_{41}-\underset{\underset{OC_2H_5}{|}}{\overset{\overset{OCH_3}{|}}{Si}}-OCH_3$ $C_{20}H_{41}-\underset{\underset{OC_3H_7}{|}}{\overset{\overset{OCH_3}{|}}{Si}}-OC_2H_5$  $C_{20}H_{41}-\underset{\underset{OC_3H_7}{|}}{\overset{\overset{OC_5H_{11}}{|}}{Si}}-OC_4H_9$

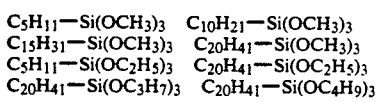

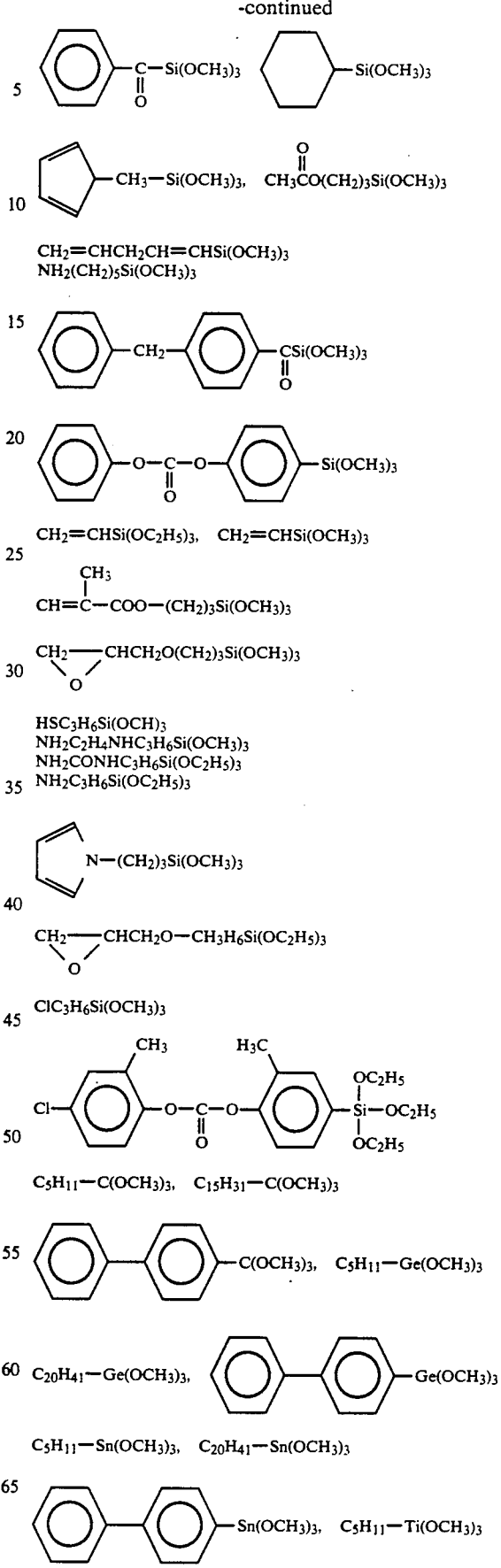

$CH_2=CHCH_2CH=CHSi(OCH_3)_3$
$NH_2(CH_2)_5Si(OCH_3)_3$ $CH_2=CHSi(OC_2H_5)_3,$  $CH_2=CHSi(OCH_3)_3$ $\underset{\underset{}{}}{\overset{\overset{CH_3}{|}}{CH_2}}=C-COO-(CH_2)_3Si(OCH_3)_3$ $\underset{\underset{O}{\diagdown\diagup}}{CH_2-CHCH_2O(CH_2)_3Si(OCH_3)_3}$ $HSC_3H_6Si(OCH)_3$
$NH_2C_2H_4NHC_3H_6Si(OCH_3)_3$
$NH_2CONHC_3H_6Si(OC_2H_5)_3$
$NH_2C_3H_6Si(OC_2H_5)_3$ $\underset{\underset{O}{\diagdown\diagup}}{CH_2-CHCH_2O-CH_3H_6Si(OC_2H_5)_3}$ $ClC_3H_6Si(OCH_3)_3$ $C_5H_{11}-C(OCH_3)_3,$  $C_{15}H_{31}-C(OCH_3)_3$ $C_{20}H_{41}-Ge(OCH_3)_3,$ $C_5H_{11}-Sn(OCH_3)_3,$  $C_{20}H_{41}-Sn(OCH_3)_3$ $C_5H_{11}-Ti(OCH_3)_3$ -continued
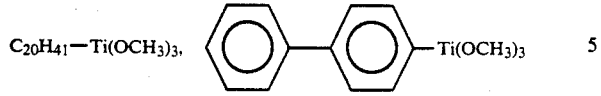
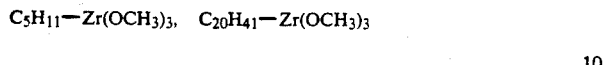
Specific examples of the metal alkoxide shown by the aforesaid formula (IIIa) are as follows:
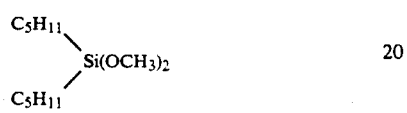
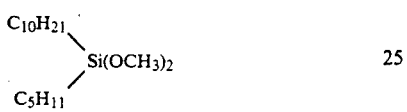
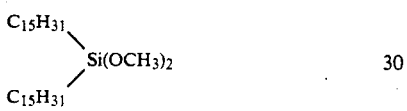
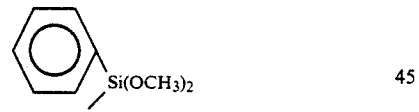
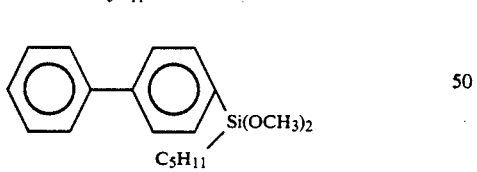
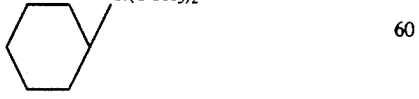
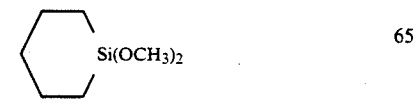
-continued
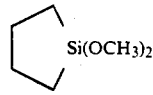
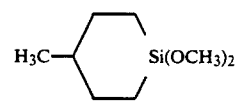
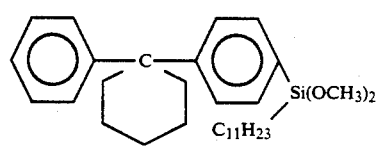
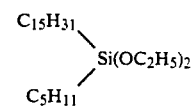
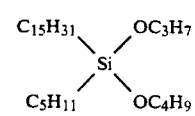
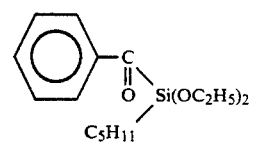
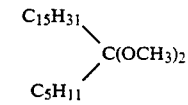
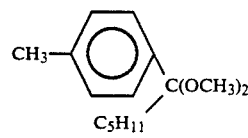
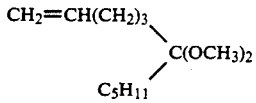
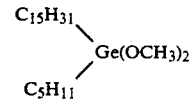
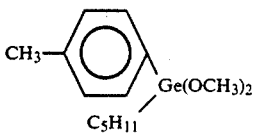
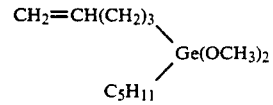

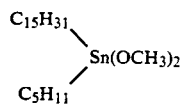
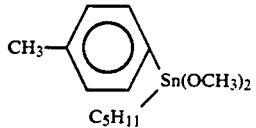
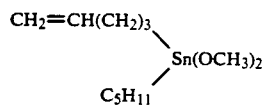
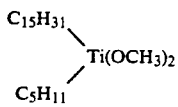
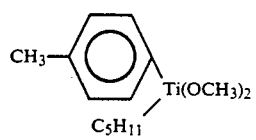
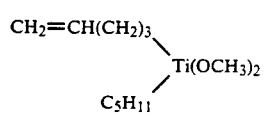
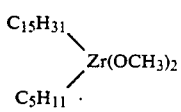
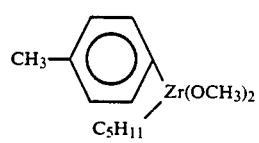
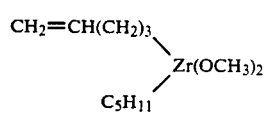
Specific examples of the metal alkoxide shown by the aforesaid formula (Ib) are as follows:
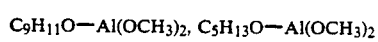
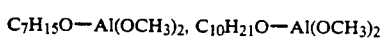
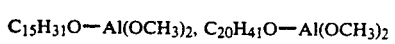
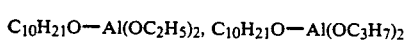
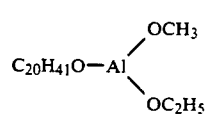
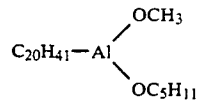
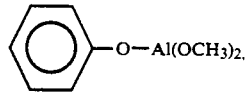
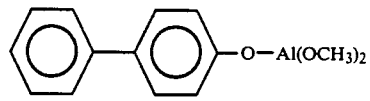
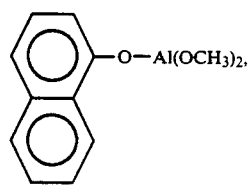
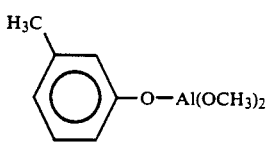
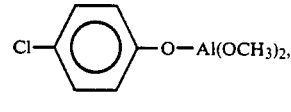
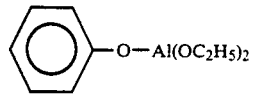
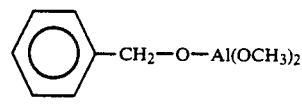
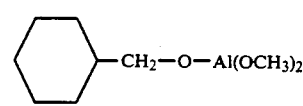
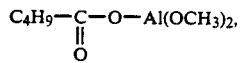
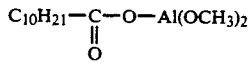
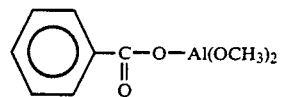

-continued
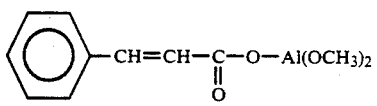
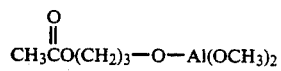
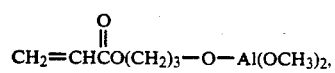
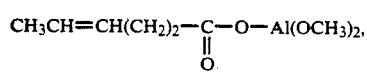
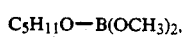
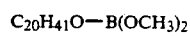
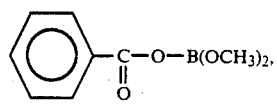
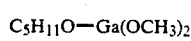
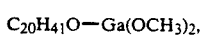
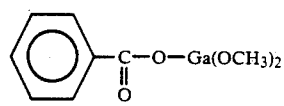
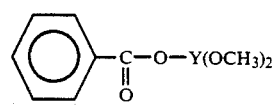
$C_{20}H_{41}O-Fe(OCH_3)_2$,
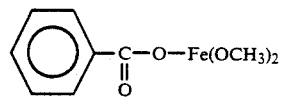
Specific examples of the metal alkoxide shown by the aforesaid formula (IIb) are as follows:
$C_5H_{11}O-Si(OCH_3)_3$,
$C_{10}H_{21}O-Si(OCH_3)_3$
$C_{20}H_{41}O-Si(OCH_3)_3$,
$C_{10}H_{21}O-Si(OC_2H_5)_3$
$C_{10}H_{21}O-Si(OC_3H_7)_3$,
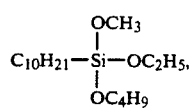
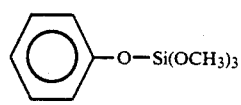
-continued
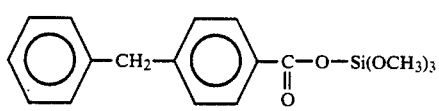
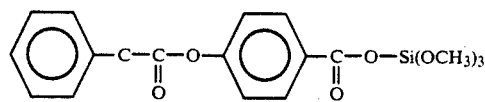
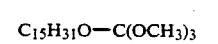
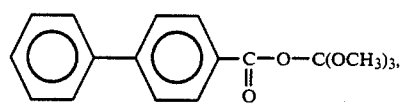
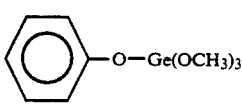
$CH_2=CHCH_2CH=CHO-Si(OCH_3)_3$
$NH_2(CH_2)_{10}O-Si(OCH_3)_3$
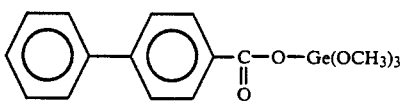
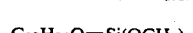
$C_{15}H_{31}O-C(OCH_3)_3$
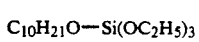
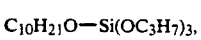
$C_{15}H_{31}O-Ge(OCH_3)_3$,
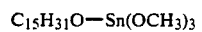
$C_{15}H_{31}O-Sn(OCH_3)_3$

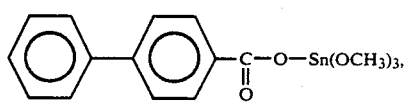

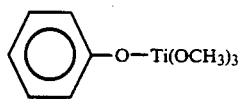

C₁₅H₃₁O—Ti(OCH₃)₃,

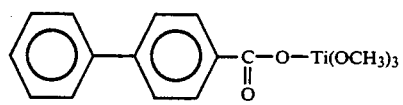

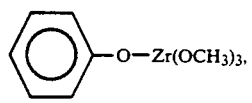

C₁₅H₃₁O—Zr(OCH₃)₃

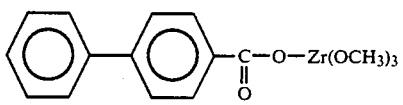

Specific examples of the metal alkoxide shown by the aforesaid formula (IIIb) are as follows:

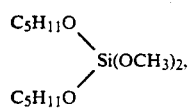

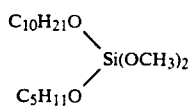

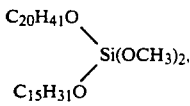

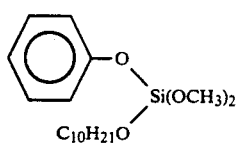

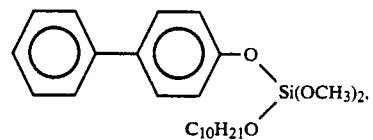

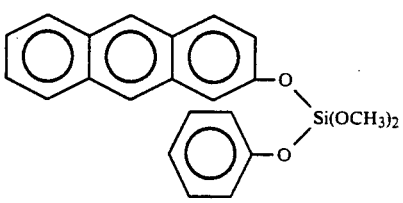

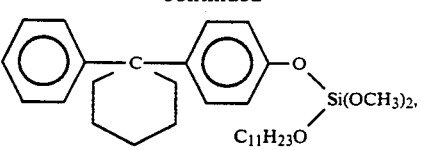

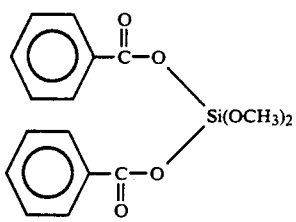

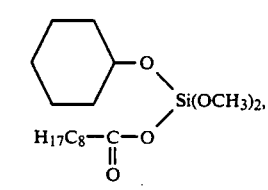

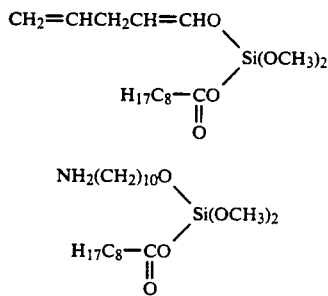

When the metal alkoxide shown by aforesaid formula (IV) or (V) is used, the metal alkoxide is used in an amount of preferably from 0 to 98 mol % and more preferably from 0.1 to 80 mol %, based on the amount of the metal alkoxide shown by aforesaid (Ia) to (IIIa) or (Ib) to (IIIb).

Also, specific examples of the metal alkoxide shown by the aforesaid formula (IV) or (V), which can be used together with the metal alkoxide shown by the aforesaid formula (Ia) to (IIIa) or (Ib) to (IIIb) in this invention are illustrated below.

That is, specific examples of the metal alkoxide shown by the aforesaid formula (IV) are as follows:

Al(OCH₃)₃,

Al(OC₂H₅)₃

Al(OC₃H₇)₃,

Al(OC₄H₉)₃

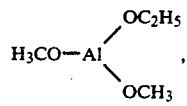

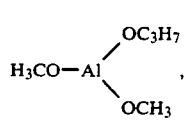

-continued
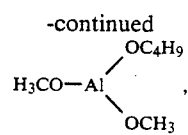
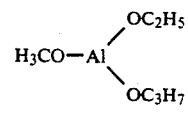
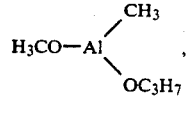
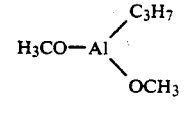
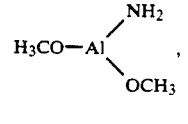
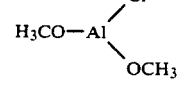
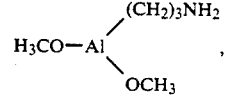
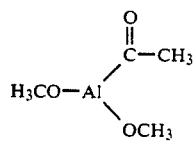
B(OCH$_3$)$_3$,
B(OC$_4$H$_9$)$_3$,
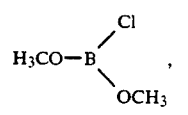
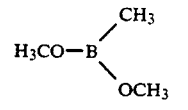
Ga(OCH$_3$)$_3$,
Ga(OC$_4$H$_9$)$_3$,
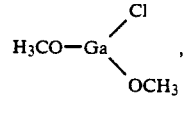
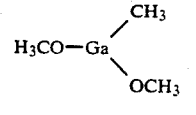
Y(OCH$_3$)$_3$,
Y(OC$_4$H$_9$)$_3$,
-continued
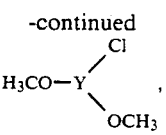
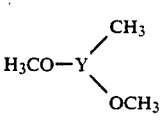
Fe(OCH$_3$)$_3$,
Fe(OC$_4$H$_9$)$_3$,
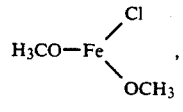
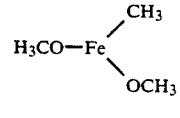
Specific examples of the metal alkoxide shown by the aforesaid formula (V) are as follows:
Si(OCH$_3$)$_4$, Si(OC$_2$H$_5$)$_4$
Si(OC$_3$H$_7$)$_4$, Si(OC$_4$H$_9$)$_4$
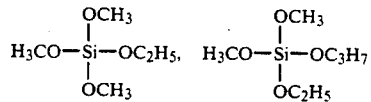
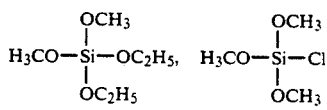
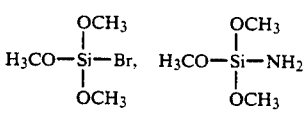
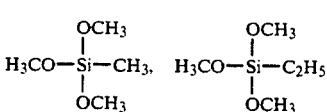
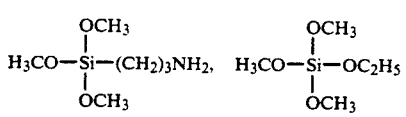
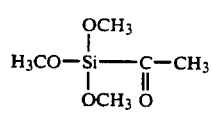
C(OCH$_3$)$_4$, C(OC$_4$H$_9$)$_4$
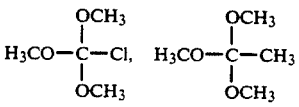
Ge(OCH$_3$)$_4$, Ge(OC$_4$H$_9$)$_4$
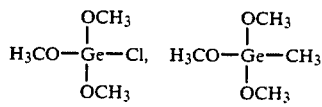

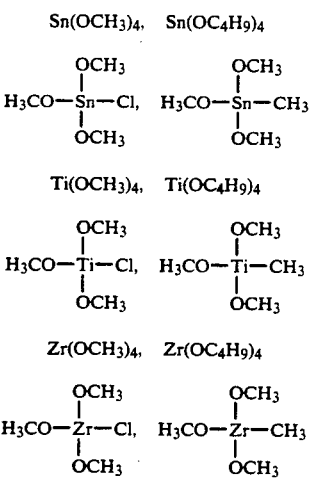

Sn(OCH$_3$)$_4$, Sn(OC$_4$H$_9$)$_4$

Ti(OCH$_3$)$_4$, Ti(OC$_4$H$_9$)$_4$

Zr(OCH$_3$)$_4$, Zr(OC$_4$H$_9$)$_4$

As the organic compound which can be used in this invention, any organic compounds having an affinity with the group X$_1$ or X$_2$ contained in the aforesaid metal alkoxide can be used.

Examples of the organic compound include photochromic materials such as dimethylaminobenzenes, thioindigos, spiropyranes, triphenylmethane dyes, imidazolyls, nitrobenzyls, indolines, etc.; coloring materials such as acridine dyes, azoic dyes, azine dyes, azomethine dyes, aniline dyes, alizarine dyes, quinoline dyes, indoline dyes, indigo dyes, methine dyes, oxazine dyes, xanthene dyes, quinocridone dyes, qunophthaline dyes, dioxadine dyes, diphenylmethane dyes, condensed polycyclic dyes, stilbene dyes, thiazine dyes, pyrylium salt dyes, triarylmethane dyes, nitro dyes, nitroso dyes, fluoran dyes, perylene dyes, formazan dyes, etc.; liquid crystal materials such as phthalocyanine series, azoic series, perylene series, squarylium series, pyrylium series, cyanine series, merocyanine series, styryl series, azomethine series, benzoquinone series, naphthoquinone series, anthraquinone series, and tetrazine series liquid crystal materials; oxadiazole derivatives such as 2,5-bis(p-diethylaminophenyl)-1,3,4-oxadiazole, etc.; pyrazoline derivatives such as 1,3,5-triphenylpyrazoline, 1-[pyridyl-(2)]-3-(p-diethylaminostyrl)-5-(p-diethylaminophenyl)pyrazoline, etc.; aromatic tertiary amino compounds such as triphenylamine, dibenzylaniline, etc.; aromatic tertiary diamino compounds such as N,N'-diphenyl N,N'-bis(3-methylphenyl)[1,1-biphenyl]-4,4'-diamine, etc.; triazine derivatives such as 3-(4'-dimethylamiophenyl)-5,6-di(4'-methoxyphenyl)-1,2,4-triazine, etc.; hydrazone derivatives such as 4-diethylaminobenzaldehyde-1,1-diphenylhydrazine, etc.; quinazoline derivatives such as 2-phenyl-4-styrylquinazoline, etc.; benzofuran derivatives such as 6-hydroxy-2,3-di(p-methoxyphenyl)benzofuran, etc.; α-stilbene derivatives such as p-(2,2-diphenylvinyl)-N,N-diphenylaniline, etc.; enamine derivatives described in Journal of Imaging Science, 29 p.p. 7 to 10 (1985); carbazole derivatives such as N-ethylcarbazole, etc.; poly-N-vinylcarbazole and derivatives thereof; poly-γ-carbazolylethyl glutamate and derivatives thereof; pyrene compounds such as pyrene, polyvinylpyrene, etc.; cyanovinyl compounds; quinone compounds; ketone compounds; fluorenone compounds; quinodimethane compounds; polyvinylanthracene, polyvinylacridine, poly-9-biphenylanthracene, pyrene-formaldehyde resins, ethylcarbazoleformaldehyde resins, etc.

Particularly, as the organic compound which is used for insulating-semiconductive films which can be used in this invention, any organic compounds having an affinity will the group X$_1$ or X$_2$ contained in the aforesaid metal alkoxide and capable of imparting semiconductivity to the coated layer can be used.

Examples of the organic compound which is preferably used for insulating-semiconductive films include charge transporting agents such as oxadiazole derivatives, pyrazoline derivatives, aromatic tertiary amine compounds, triazine derivatives, hydrazone derivatives, quinazoline derivatives, benzofuran derivatives, stilbene derivatives, enamine derivatives, carbazole derivatives, pyrene compounds, cyanovinyl compounds, quinone compounds, ketone compounds, fluorenone compounds and quinodimethane compounds.

Further, as the organic compound which is used as a charge transporting agent for an electrophotographic photoreceptor which can be used in this invention, any organic compounds having an affinity with the hydrophobic group X$_1$ or X$_2$ contained in the aforesaid metal alkoxide can be used.

Examples of the organic compound include charge transporting agents, for example, oxadiazole derivatives such as 2,5-bis(p-diethylaminophenyl)-1,3,4-oxadiazole, etc ; pyrazoline derivatives such as 1,3,5-triphenylpyrazoline, 1-[pyridyl-(2)]-3-(p-diethyl-aminostyryl)-5-(p-diethylaminophehyl)pyrazoline, etc.; aromatic tertiary amino compounds such as triphenylamine, dibenzylaniline, etc.; aromatic tertiary diamino compounds such as N,N'-diphenyl-N,N'-bis(3-methylphenyl)[1,1-biphenyl]-4,4'-diamine, etc.; 1,2,4-triazine derivatives such as 3-(4'-dimethylaminophenyl)-5,6-di(4'-methoxyphenyl)-1,2,4-triazine, etc.; hydrazone derivatives such as 4-diethylaminobenzaldehyde-1,1-diphenylhydrazine, etc.; quinazoline derivatives such as 2-phenyl-4-styrylquinazoline, etc.; benzofuran derivatives such as 6-hydroxy-2,3-di(p-methoxyphenyl)benzofuran, etc.; α-stilbene derivatives such as p-(2,2-diphenylvinyl)-N,N-diphenylaniline, etc.; enamine derivatives described in Journal of Imaging Science, 29 p.p. 7 to 10 (1985); carbazole derivatives such as N-ethylcarbazole, etc.; poly N-vinylcarbazole and derivatives thereof; poly-γ-carbazolylethyl glutamate and derivatives thereof; pyrene compounds such as pyrene, polyvinylpyrene, etc.; polyvinylanthracene, polyvinylacridine, poly-9-biphenylanthracene, pyreneformaldehyde resins, ethylcarbazole-formaldehyde resins, etc.

However, the organic compounds, the organic compound for insulating-semiconductive films or the organic compound as a charge transporting agent for an electrophotographic photoreceptor which can be used in this invention are not limited to the aforesaid materials. Also, the aforesaid organic compounds can be used singly or as a mixture thereof.

The content of the aforesaid organic compounds, depends upon the us of the inorganic-organic or semiconductive inorganic-organic composite materials of this invention is generally from $1 \times 10^{-4}$ to 99.99% by volume based on the volume of the metal alkoxide. Particularly, the content of the organic compounds for insulating-semiconductive films is preferably from $1 \times 10^{-4}$ to 50% by volume based on the volume of the metal alkoxide. Further, the content of the organic compounds as a charge transporting agent for an electrophotographic photoreceptor (e.g., a charge transporting layer) is preferably from 0.1 to 99.0% by volume and particularly preferably from 20 to 80% by volume based on the volume of the metal alkoxide.

The inorganic-organic or semiconductive inorganic-organic composite material of this invention is prepared by adding the aforesaid metal alkoxide and a definite amount of the organic compound being contained to a proper solvent such as water, alcohol, toluene, xylene, halogenated hydrocarbons, etc., followed by gelatinization or gelatinizing the aforesaid metal alkoxide by a proper method and then immersing the gel formed in a solution of the organic compound being dissolved in a proper solvent, whereby the gel is impregnated with the organic compound. Also, in this case, for accelerating the reaction for the gelation, a catalyst such as an acid (e.g., hydrochloric acid, sulfuric acid and nitric acid) and a base (e.g., ammonium and hydroxide), etc., can be, if desired, used. Furthermore, if desired, the product may be subjected to a heat treatment of generally from 30° C. to 150° C., and preferably from 50° C. to 500° C.

In the inorganic-organic or semiconductive inorganic-organic composite material of this invention prepared as described above, the organic compound (including the organic compound for a charge transporting layer) is in a state of being dispersed in the matrix formed by the polycondensation of the metal alkoxide.

Figure 1B:
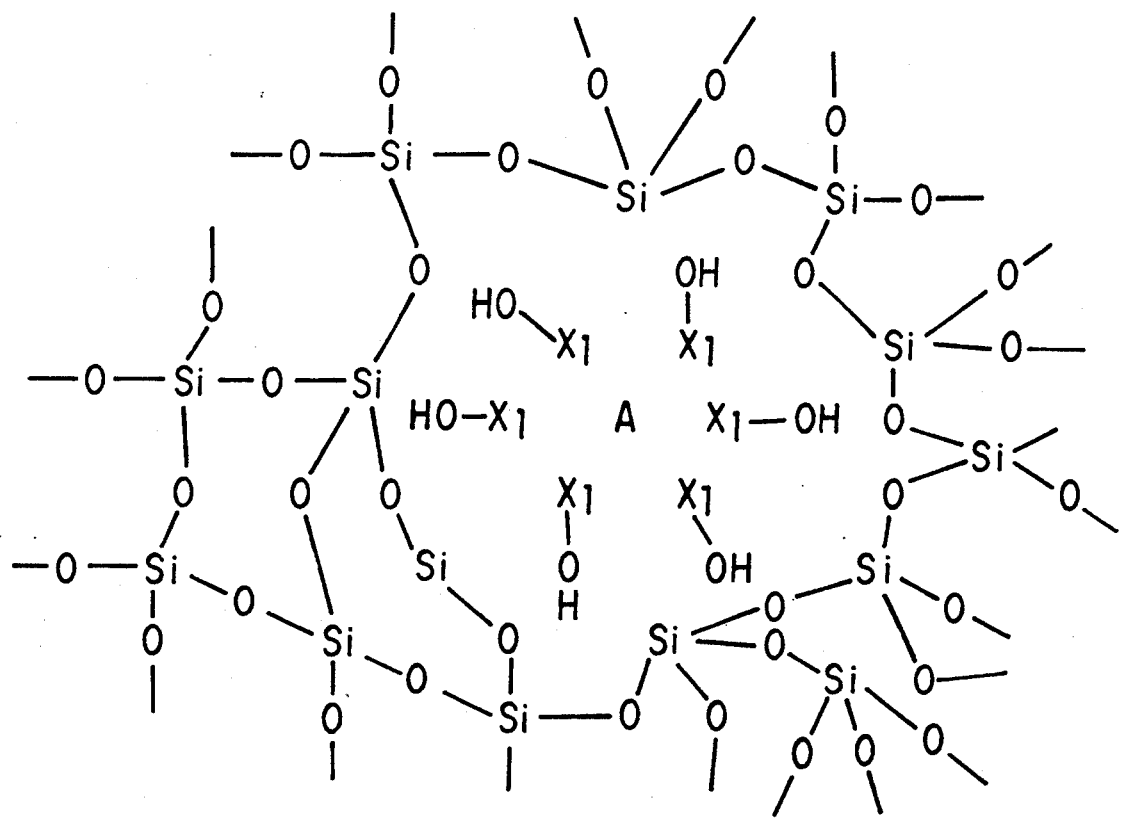

The dispersion state of the organic compound is shown in drawings FIG. 1-a and FIG. 1-b. That is, the organic compound A having an affinity with the (hydrophobic) groups $X_1$ (or $X_2$) is surrounded by the micell structure of the aggregate of the (hydrophobic) groups $X_1$ (or $X_2$) formed in the matrix composed of the polycondensate of the metal alkoxide. Accordingly, the organic compound is contained in the matrix in a stabilized state.

Therefore, in the electrophotographic photoreceptor of this invention, the charge transferring material is contained in the charge transporting layer in a stabilized state.

The thickness of the charge transporting layer is generally from about 2 to 100 μm and preferably 5 to 50 μm.

In addition, in the electrophotographic photoreceptor of this invention, a barrier layer may be formed on a conductive support. The barrier layer is effective for inhibiting the injection of unnecessary charges from the conductive support into the photoconductive layer (photosensitive layer) and has a function of improving the image quality formed.

As a material of constituting the barrier layer, there are metal oxides such as aluminum oxide, etc., and acryl resins, phenol resins, polyester resins, polyurethane resins, etc.

Then, this invention is explained practically by the following examples.

EXAMPLE I-1(a)

In 200 parts by weight of cyclohexanone were dissolved 10 parts by weight of tetramethoxysilan Si-(OCH₃)₄, 10 parts by weight of an alkoxysilane having the following structure,

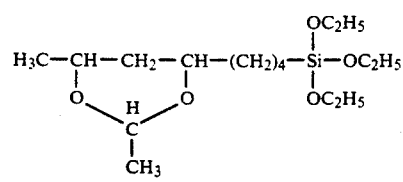

and 10 parts by weight of a carge transporting agent having the following structure,

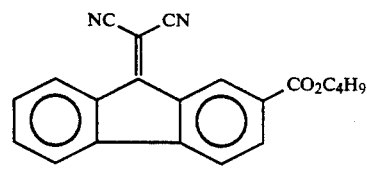

and the solution thus obtained was coated on a silicon base plate by a dip coating method and dried for 90 minutes at 150° C. to form a layer having a thickness of 1.6 μm.

Figure 2:
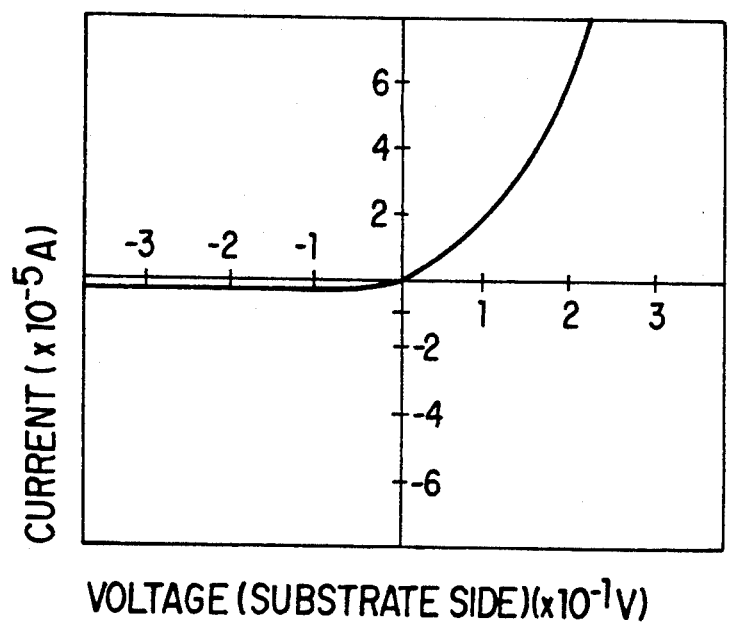
FIG. 2 is a graph showing the current-voltage characteristic curve of the semiconductor element in Example I - 1(a), FIG. 3-a is a graph showing the absorption spectra of hydroxyazobenzene, FIG. 3-b is a graph showing the absorption spectra of hydroxyazobenzene, and FIG. 4-a is a graph showing the relation between the amount of octyltriethoxysilane and the absorption peak of the azo type in Example II - 1(a), FIG. 4-b is a graph showing the relation between the amount of $C_{18}H_{37}OSi(OCH_3)_3$ and the absorption peak of the azo type.

Then, an electrode composed of Au was formed on the layer by a vacuum evaporation method to provide a sample having a structure of Si/SiO₂(surface oxide film)/semiconductive inorganic-organic composite material/Au.

on the sample, a current-voltage characteristic curve was measured using an electrometer (Type 617, manufactured by Keithkey Co.) and the result was shown in FIG. 2. As is apparent from the result shown in FIG. 2, it is clearly seen that the aforesaid (semiconductive) inorganic-organic composite material showed a rectifying action and acted as an n-type semiconductor.

EXAMPLE I-1(b)

By following the same procedure as Example I-1(a) described above except that 10 parts by weight of an alkoxysilane having the following structure was used in place of 10 parts by weight of the alkoxysilane used therein, a sample was prepared.

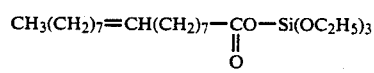

On the sample, a current-voltage characteristic curve was measured as is Example I-1(a). The sample showed the same rectifying action as in Example I-1(a) and functioned as an n-type semiconductor.

EXAMPLE I-2(a)

By following the same procedure as Example I-1(a) except that a charge transporting agent having the structure having the following structure was used in place of the charge transporting agent in Example I-1(a), a film composed of a semiconductive inorganic-organic composite material was formed. The thickness of the film formed was 1.3 μm.

On the sample, a current-voltage characteristic curve was measured as in Example I-1(a). The sample showed the same rectifying action as in Example I-1(a) and functioned as an n-type semiconductor.

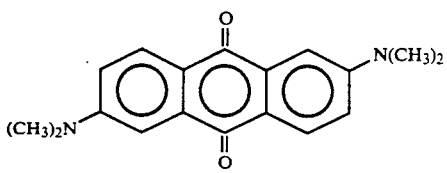

EXAMPLE I-2(b)

By following the same procedure as Example I-1(b) except that a charge transporting agent having the following structure was used in place of the charge transporting agent in the example, a film composed of a semiconductive inorganic-organic composite material was formed. The thickness of the film was 1.3 μm. On the sample, a current-voltage characteristic curve was measured by the same manner as in Example I-1(b). The sample also showed a rectifying action and acted as an n-type semiconductor as in Example I-1(b).

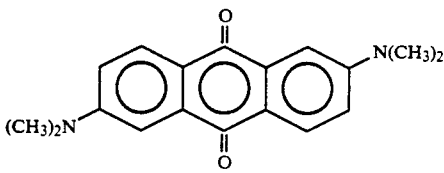

EXAMPLE I-3(a)

By following the same procedure as Example I-1(a) described above except that a charge transporting agent having the following structure was used in place of the charge transporting agent in Example I-1(a) a film composed of a semiconductive inorganic-organic composite material was formed. The thickness of he film was 1.5 μm.

On the sample, a current-voltage characteristic curve was measured as in Example I-1(a). The sample also showed a rectifying action and functioned as a p-type semiconductor.

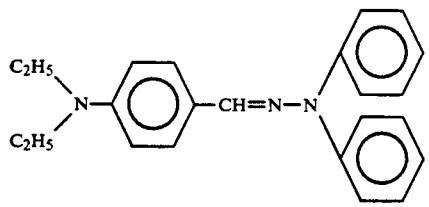

EXAMPLE I-3(b)

By following the same procedure as Example I-1(b) except that a charge transporting agent having the following structure was used in place of the charge transporting agent in Example I-1(b) a film composed of a semiconductive inorganic-organic composite material was formed. The thickness of the film was 1.5 μm.

On the sample, a current-voltage characteristic curve was measured by the same manner as in Example I-1(b). The sample also showed a rectifying action as in Example I-1(b) and functioned as a p-type semiconductor.

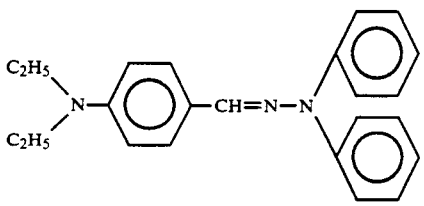

COMPARATIVE EXAMPLE I-1(a)

By following the same procedure as in Example I-1(a) described above except that tetramethoxysilane only was used in place of the alkoxysilane, a film composed of a semiconductive inorganic-organic composite material was formed. In this case, however, after drying, the cyano compound added was deposited, whereby a uniform film could not be formed.

COMPARATIVE EXAMPLE I-1(b)

By following the same procedure as in Example I-1(b) except that tetramethoxysilane only was used in place of the alkoxysilane, a film composed of a semiconductive inorganic-organic composite material was formed. In this case, however, after drying, the cyano compound added was deposited, whereby a uniform layer could not be formed.

EXAMPLE I-4(a)

By following the same procedure as in Example I-1(a) using an aluminum pipe as the conductive substrate, a film composed of a semiconductive inorganic-organic composite material was formed thereon. The thickness of the film was 1.0 μm.

On the above layer (film) as an undercoating layer, a charge generating layer was formed. That is, a mixture of 90 parts by weight of trigonal system selenium (made by Xerox Corporation), 10 parts by weight of a polyvinylbutyral resin, and 300 parts by weight of n-butanol was dispersed using an attritor. After diluting the dispersion formed by adding 2 parts by weight of n-butanol per part by weight of the dispersion, the diluted liquid was coated on the aforesaid undercoating layer by draw coating and dried to form the charge generating layer of 0.3 μm in thickness. Subsequently, 4 parts by weight of N,N'-diphenyl-N,N'-bis(3-methylphenyl)-[1,1'-biphenyl]-4,4'-diamine and 6 parts by weight of a polycarbonate resin were dissolved in 40 parts by weight of toluene to provide a coating composition and the composition was coated on the aforesaid charge generating layer by draw coating and dried for 60 minutes at 120° C. to form a charge transporting layer having a thickness of 21 μm.

On the electrophotographic photoreceptor thus obtained, various electrophotographic characteristics were evaluated. The electrophotographic characteristics were measured using an electrophotographic characteristics evaluating apparatus manufactured by Fuji Xerox Co.

The photoreceptor was charged such that the electric current entered became $-10$ μA and after one second from charging, the surface potential of the photoreceptor was measured. The value was defined as $V_{DDP}(0)$. Thereafter, the charges were removed by exposing using a tungsten lamp, the potential after erasing the charge was measured, and the value was defined as residual potential $V_{RP}(0)$. Subsequently, the photoreceptor was charged while controlling the electric current entered to the photoreceptor such that $V_{DDP}$ became 500 volts, after 0.3 second from the charging, the photoreceptor was exposed by monochromatic light having a wavelength of 550 nm while charging the exposure amount, and the exposure amount at which the potential after 0.7 second from the light exposure (after one second from the charging) became $-250$ volts was determined and was defined as a photosensitivity $E_{\frac{1}{2}}(0)$. Then the photoreceptor was charged while keeping the charging condition such that the current entered became $-10$ μA, charging and discharging steps were repeated 10,000 times, and then the surface potential of the photoreceptor $V_{DDP}(10,000)$, the residual potential $V_{RP}(10,000)$, and the photosensitivity $E_{\frac{1}{2}}(10,000)$ in that case were measured.

The results obtained are shown in Table 1 below.

EXAMPLE I-4(b)

By following the same procedure as in Example I-1(b) except that an aluminum pipe was used as the conductive substrate, a film composed of a semiconductive inorganic-organic film was formed.

Then, by following the same procedure as Example I-4(a), a charge generating layer and a charge transporting layer were formed on the aforesaid layer of an undercoating layer to provide an electrophotographic photoreceptor and on the photoreceptor, the electrophotographic characteristics were evaluated by the same manners as in Example I-4(a).

The results obtained are also shown in Table 1 below.

COMPARATIVE EXAMPLE I-2(a)

A coating composition composed of 10 parts by weight of a polyamide resin, 150 parts of methanol, and 40 parts by weight of water was coated on an aluminum pipe by draw coating to form an undercoating layer having a dry thickness of 1 μm. Then, by following the same procedure as in Example I-4(a) described above, a charge generating layer and a charge transporting layer were formed on the undercoating layer to provide an electrophotographic photoreceptor.

On the electrophotographic photoreceptor thus obtained, the electrophotographic characteristics were evaluated by the same manners as shown in Example I-4(a) and the results obtained are shown in Table 1.

COMPARATIVE EXAMPLE I-2(b)

A coating composition composed of 10 parts by weight of a polyamide resin, 150 parts of methanol, and 40 parts by weight of water was coated on an aluminum pipe by draw coating to form an undercoating layer having a dry thickness of 1 μm. Then, by following the same procedure as in Example I-4(b) a charge generating layer and a charge transporting layer were formed on the undercoating layer to provide an electrophotographic photoreceptor. On the electrophotographic photoreceptor, the electrophotographic characteristics thereof were evaluated by the same manners as in Example I-4(b) and the results obtained are shown in Table 1.

TABLE 1

|  | $V_{DDP}(0)$ (volt) | $V_{RP}(0)$ (volt) | $E_{\frac{1}{2}}(0)$ (erg/cm$^2$) | $V_{DDP}$ (10000) | $V_{RP}$ (10000) | $E_{\frac{1}{2}}$ (10000) |
| --- | --- | --- | --- | --- | --- | --- |
| Example | $-780$ | $-20$ | 1.2 | $-770$ | $-25$ | 1.3 |
| I-4(a) |  |  |  |  |  |  |
| Comparative Example I-2(a) | $-790$ | $-20$ | 1.4 | $-850$ | $-55$ | 2.2 |
| Example I-4(b) | $-770$ | $-15$ | 1.1 | $-740$ | $-10$ | 1.1 |
| Comparative Example I-2(b) | $-790$ | $-20$ | 1.4 | $-850$ | $-55$ | 2.2 |

As is apparent from the comparison of Examples I-1(a), I-1(b), I-2(a), I-2(b), I-3(a), and I-3(b) with Comparative Examples I-1(a) and I-a(b) in Table 1, it is clearly seen that the rectifying property of metal oxides can be controlled according to this invention and functional inorganic-organic composite materials can be easily produced.

Furthermore, as is apparent from the comparison of Examples I-4(a) and I-4(b) with Comparative Examples I-2(a) and I-2(b), it is clearly seen that when the inorganic-organic composite material of this invention is used as an undercoating layer for an electrophotographic photoreceptor, an electrophotographic photoreceptor showing no increase of residual potential and/or reduction of photosensitivity by repeated use thereof can be provided. This is considered to be based on that the undercoating layer of this invention does not cause the accumulation of space charges causing the increase of residual potential and/or the reduction of photosensitivity.

As described above, in the semiconductive inorganic-organic composite material of this invention, the organic compound having a hydrophobic group is stably contained in the matrix composed of the polycondensation product of the metal alkoxide and hence the composite material is not influenced by moisture absorbed and impurity ions in the high molecular polymer. Also, the inorganic-organic composite material can easily form a layer or film having a large area as well as is advantageous in the point of cost and is excellent in weather resistance, hardness, and abrasion resistance.

Accordingly, the semiconductive inorganic-organic composite material of this invention is useful for semiconductor transistor elements, switching elements, and electrophotographic materials.

EXAMPLE II-1(a)

To 100 parts by weight of tetramethoxysilane Si(OCH$_3$)$_4$] was added from 0.03 to 7 parts by weight of octylethoxysilane [C$_8$H$_{17}$Si(OC$_2$H$_5$)$_3$] and then 50 parts by weight of an ethanol solution of p-hydroxyazobenzene (20 mg/100 9) was added to the mixture to provide a liquid mixture. Subsequently after adding an aqueous solution of 0.075 N of hydrochloric acid to the aforesaid liquid mixture, the resulting mixture was allowed to stand at room temperature to cause hydrolysis, whereby the mixture was gelatinized to provide a composite material. The composite material thus obtained could be used as a ultraviolet absorption glass.

Figure 3A:
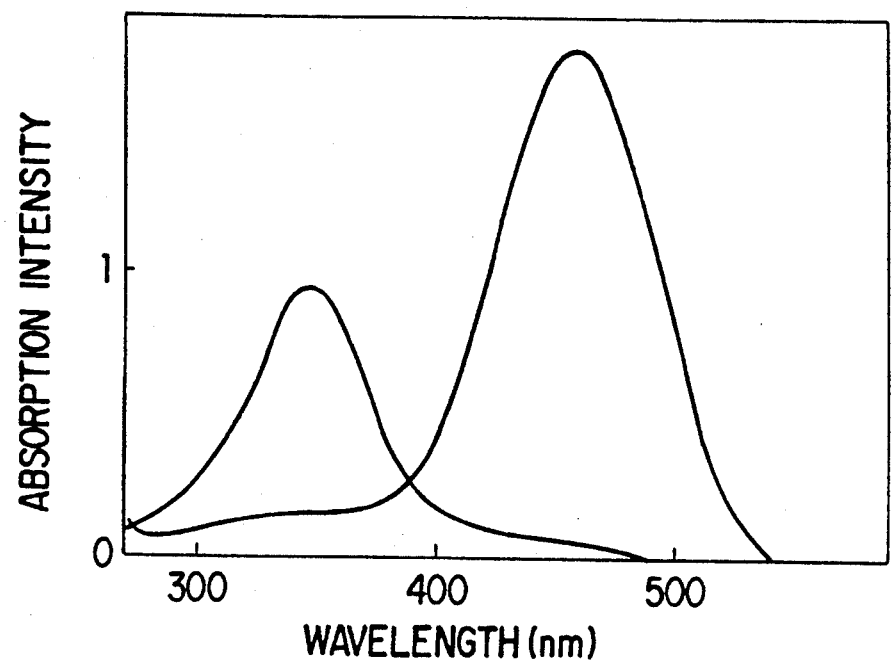
Figure 3B:
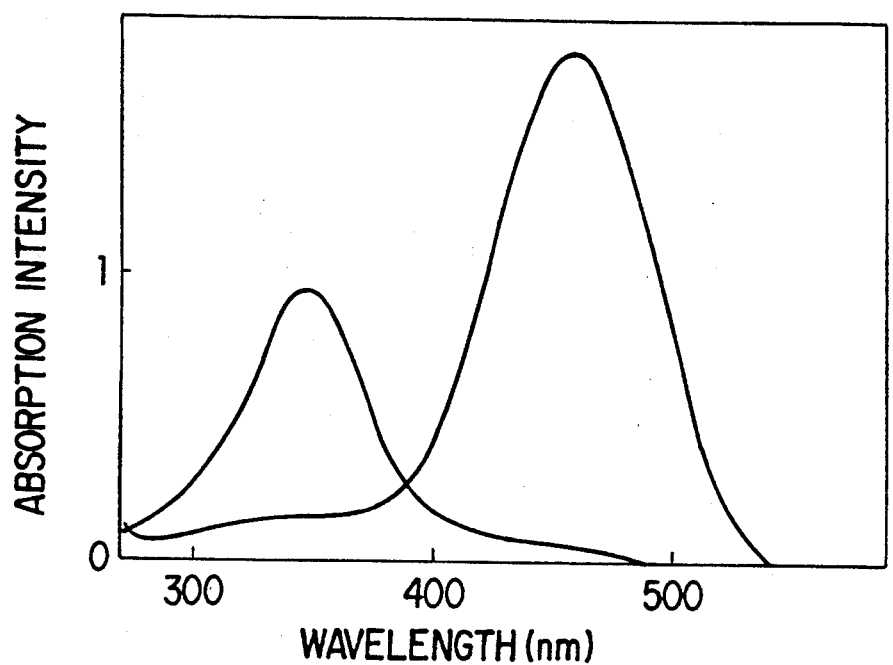

It is known that p-hydroxyazobenzene shows a strong absorption peak near 460 nm by an equilibrium reaction to a hydrazone type in the presence of H+ (HCl). FIG. 3-$a$ is a graph showing an absorption spectrum of hydroxyazobenzene, wherein A stands for the absorption spectrum of the hydrazo type and B stands for the absorption spectrum of the azo type.

If the amount of octyltriethoxysilane is gradually increased, the absorption of the hydrazo type is gradually decreased and the absorption of the azo type appears. Thus, if the ratio of the absorption intensity at 340 nm which is the absorption peak of the azo type, to the absorption intensity at 460 nm which is the absorption peak of the hydrazo type, is plotted to the amount of octyltriethoxysilane, a graft shown in FIG. 4-a is obtained. As is apparent from FIG. 4-a, it is clearly seen that the absorption intensity ratio shows the abrupt raising of the curve near 3 mol % in the concentration of octyltriethoxysilane and the absorption of 340 nm becomes strong. This is caused by that p-hydroxyazobenzene is surrounded by the aggregate (micell) of octyl groups and is isolated from $H^+$, which shows that the octyl groups forms a hydrophobic field.

EXAMPLE II-1(b)

Figure 4A:
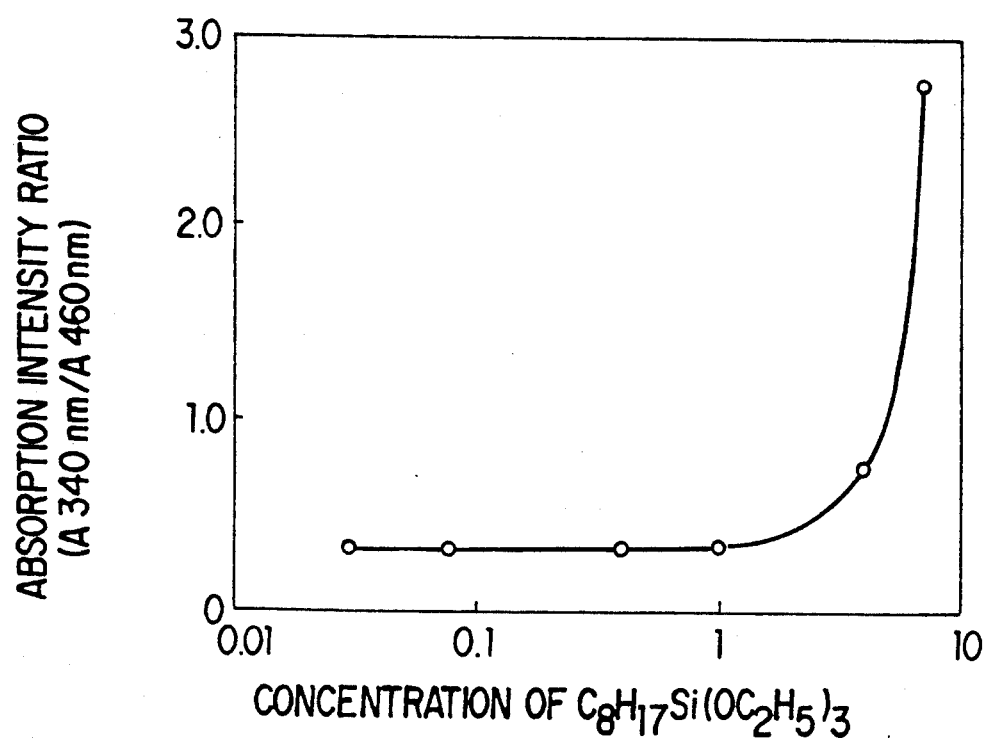
Figure 4B:
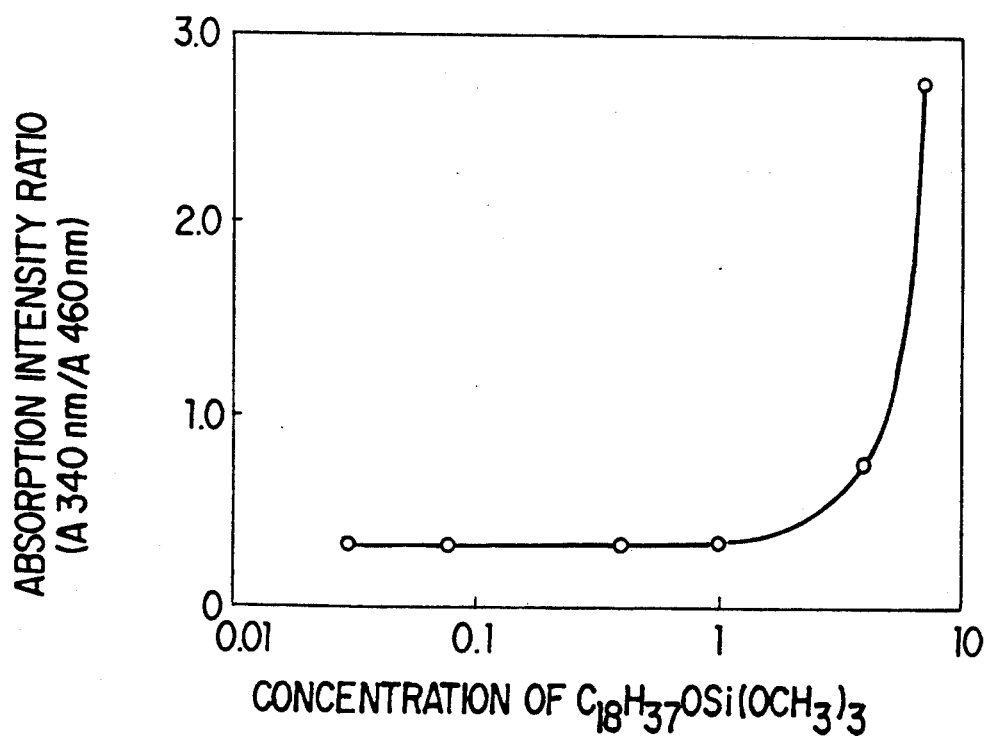

By following the same procedure as Example II-1(a) except that from 0.03 to 7 parts by weight of $C_{18}H_{37}OSi(OCH_3)_3$ was used in place of octyltriethoxysilane in Example II-1(a), an inorganic-organic composite material was produced. The absorption spectra of hydroxyazobenzene are shown in FIG. 3-b and the graph formed by plotting the ratio of the absorption intensity of the azo type absorption peak to the absorption intensity of the hydrazo type absorption peak is shown in FIG. 4-b. As is apparent from the figures, almost same results as in Example II-1(a) was obtained.

EXAMPLE II-2(a)

The same procedure as Example II-1(a) except that $C_{12}H_{17}Si(OC_2H_5)_3$ was used in place of $C_8H_{17}Si(OC_2H_5)_3$ was followed. In this case, it was also been confirmed that the equilibrium reaction of p-hydroxyazobenzene occured in azo type side and the groups $C_{12}H_{17}$- formed micell-form aggregates.

EXAMPLE II-2(b)

The same procedure as Example II-1(b) except that $CH_3(CH_2)_8=(CH_2)_8OSi(OC_2H_5)_3$ was used in place of $C_{18}H_{37}OSi(OCH_3)_3$ was followed. In this case, it was also confirmed that the equilibrium reaction of p-hydroxyazobenzene occured in the azo type side and the groups $CH_3(CH_2)_8=(CH_2)_8OH$ formed micell-form aggregates.

EXAMPLE II-3(a)

The same procedure as Example II-1(a) except that $C_6F_{13}CH_2CH_2Si(OC_2H_5)_3$ was used in place of $C_8H_{17}Si(OC_2H_5)_3$ was folled. In this case, it was also confirmed that the equilibrium reaction of p-hydroxyazobenzene occured in the azo type side and the groups $C_6F_{13}CH_2CH_2$- formed micell-form aggregates.

EXAMPLE II-3(b)

The same procedure as Example II-1(b) except that $(C_{20}H_{41}O)_2Si(OC_2H_5)_2$ was used in place of $C_{18}H_{37}OSi(OCH_3)_3$ was followed. In this case, it was confirmed that the equilibrium reaction of p-hydroxyazobenzene occured in the azo type side and the groups $C_{20}H_{41}OH$ formed micell-form aggregates.

EXAMPLE II-4(a)

A mixture of 100 parts by weight of tetramethoxysilane [$Si(OCH_3)_4$], 10 parts by weight of $C_{12}H_{25}Si(OC_2H_5)_3$, and 50 parts by weight of ethanol was mixed with 60 parts by weight of an aqueous solution of 0.075 N of hydrochloric acid and the resulting mixture was gelatinized in a closed system at room temperature. The gel thus formed was allowed to stand one day and thereafter was immersed in a toluene solution of a dye, $CH_3(CH_2)_7CH=CH-(CH_2)_7-COONH_4$, whereby the gel was impregnated with the dye. The gel obtained was allowed to stand for 2 weeks at room temperature and dry to provide a dye-containing silica gel. It was confirmed that in the silica gel, no deposition of the dye occured and the dye was stably contained in the gel.

EXAMPLE II-4(b)

A mixture of 100 parts by weight of tetramethoxysilane 10 parts by weight of $CH_3(CH_2)_8=(CH_2)_8-OSi(OC_2H_5)_3$, and 50 parts by weight of ethanol was mixed with 60 parts by weight of an aqueous solution of 0.075 N hydrochloric acid and the resulting mixture was gelatinized in a closed system at room temperature. The gel thus formed was allowed to stand for one day and thereafter, the gel was immersed in a toluene solution of a dye, $CH_3(CH_2)_7CH=CH-(CH_2)_7-COONH_4$, whereby the gel was impregnated with the dye. The gel obtained was allowed to stand for 2 weeks at room temperature to be dried to provide a dye-containing silica gel. It was confirmed that in the silica gel, no deposition of the dye occured and the dye was stably contained in the gel.

COMPARATIVE EXAMPLE II-1(a)

By following the same procedure as example II-4(a) except that $C_{12}H_{25}Si(OC_2H_5)_3$ was omitted, a silica gel was prepared. When the silica gel was allowed to dry at room temperature, the deposition of the dye occured and thus the dye could not be stably contained in the gel.

COMPARATIVE EXAMPLE II-1(b)

By following the same procedure as example II-4(b) except that $CH_3(CH_2)_8=(CH_2)_8OSi(OC_2H_5)_3$ was omitted, a silica gel was prepared. When the silica gel was allowed to dry at room temperature, the deposition of the dye occured and the dye could not be stably contained in the gel.

As described above, according to the process of this invention, a silica gel stably containing the organic compound having a hydrophobic group in the matrix composed of the polycondensation product of the metal alkoxide can be produced and hence if the organic compound having a desired function is selected, a composite material having a high hardness and high abrasion resistance as oxide glass and the function of the organic compound can be obtained.

Thus, the process of this invention is useful for the preparation of photochromic materials, photochemical-holeburning materials, memory disc, electrophotographic photoreceptor, ultraviolet absorption materials, colored glasses, etc.

EXAMPLE III-1(a)

A coating composition composed of 10 parts by weight of a polyamide resin, 150 parts by weight of methanol, and 40 parts by weight of water was coated on an aluminum pipe as a conductive substrate by draw coating and dried to form an undercoating layer having a thickness of 1 μm. Subsequently, a charge generating layer was formed as follows. That is, a mixture of 90 parts by weight of trigonal system selenium, 10 parts by weight of a polyvinylbutyral resin, and 300 parts by weight of n-butanol was dispersed using an attritor and a diluted dispersion was obtained by adding 2 parts by weight of n-butanol to 1 part of the dispersion. The diluted dispersion was coated on the undercoating layer by draw coating and dried to form a charge generating layer of 0.3 μm in thickness.

In 140 parts by weight of monochlorobenzene were dissolved 7 parts by weight of N,N'diphenyl-N,N'-bis(3-methylphenyl)-[1,1'-biphenyl]-4,4'-diamine, 10 parts by weight of chlorophenyltriethoxysilane, and 3 parts by weight of tetraethoxysilane to provide a coating composition. The composition was coated on the aforesaid charge generating layer by draw coating and dried for 90 minutes at 170° C. to form a charge transporting layer having a thickness of 14 μm. Thus, an electrophotographic photoreceptor was prepared.

On the electrophotographic photoreceptor obtained, various electrophotographic characteristics and printing impression were evaluated.

That is, the light-sensitive material was charged such that the entered current became $-10$ μA and after one second from charging, the surface potential of the light-sensitive material was measured and the potential was defined as $V_{DDP}$. Thereafter, the charges were erased and the surface potential after discharging was measured and the potential was defined as residual potential $V_{RP}$.

Subsequently, the photoreceptor was charged again such that $V_{DDP}$ became $-500$ volts by controlling the entered current, after 0.3 second from charging, the photoreceptor was exposed to monochromatic light having a wavelength of 550 nm while changing the exposure amount, the exposure amount by which the potential after 0.7 second from the exposure (one second after charging) became $-250$ volts was defined as light sensitivity $E_{\frac{1}{2}}$.

Also, the printing impression was evaluated by the presence or absence of image defects by the abrasion and scratchs of the surface of the photoreceptor after copying 100,000 copies using an electrophotographic copying machine ("FX5014", trade name, manufactured by Fuji Xerox Co.) and the abraded amount of the surface.

The results obtained are shown in Table 2 below.

EXAMPLE III-1(b)

The same procedure as Example III-1(a) except that 10 parts by weight of the alkoxysilane having the following structure was used in place of 10 parts by weight of chlorophenyltriethoxysilane used in Example III-1(a).

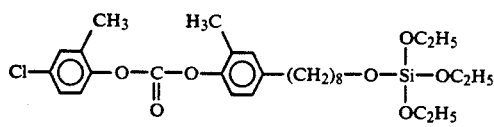

EXAMPLE III-2(a)

By following the same procedure as Example III-1(a), an undercoating layer and a charge generating layer were formed on a conductive substrate and then a charge transporting layer was formed thereon as shown below to provide an electrophotographic photoreceptor.

That is, a coating composition was prepared by dissolving 6 parts by weight of N,N'-diphenyl-N,N'-bis(3-methylphenyl)-[1,1'-biphenyl]-4,4'-diamine, 10 parts by weight of an alkoxysilane shown by the following structural formula

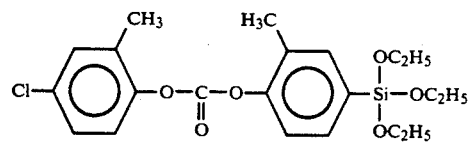

and 4 parts by weight of tetraethoxysilane in 140 parts by weight of monochlorobenzene, coated on the aforesaid charge generating layer by a draw coating method, and dried for 90 minutes at 170° C. to form a charge transporting layer having a thickness of 15 μm.

On the electrophotographic photoreceptor, the electrophotographic characteristics and printing impression were evaluated in the same manner as in Example III-1(a). The results obtained are shown in Table 2 below.

EXAMPLE III-2(b)

After an undercoating layer and a charge generating layer on a conductive substrate were formed by the same procedure as in Example III-1(a), a charge transporting layer was formed as follows to provide an electrophotographic photoreceptor.

That is, a coating composition prepared by dissolving 6 parts by weight of N,N,-diphenyl-N,N'-bis(3-methylphenyl)-[1,1'-biphenyl]-4,4'-diamine, 10 parts by weight of an alkoxysilane shown by the following structural formula

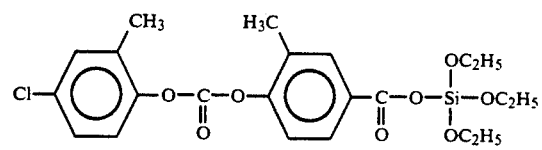

and 4 parts by weight of tetraethoxysilane in 140 parts by weight of monochlorobenzene, coated on the aforesaid charge generating layer by a draw coating method and dried for 90 minutes at 170° C. to form the charge transporting layer having a thickness of 14 μm.

On the electrophotographic photoreceptor, the electrophotographic characteristics and printing impression were evaluated in the same manner as in Example III-1(a). The results obtained are shown in Table 2 below.

COMPARATIVE EXAMPLE III-1(a)

After an undercoating layer and a charge generating layer on a conductive substrate were formed by the same procedure as in Example III-1(a), a charge transporting layer was formed as follows to provide an electrophotographic photoreceptor.

That is, a coating composition prepared by dissolving 4 parts by weight of N,N'-diphenyl-N,N'-bis(3-methylphenyl)-[1,1'-biphenyl]-4,4'-diamine and 6 parts by weight of a polycarbonate resin [bisphenol Z type: PC(Z)] in 90 parts by weight of monochlorobenzene was coated on the aforesaid charge generating layer by a draw coating method and dried for 90 minutes at 170°

C. to form the charge transporting layer having a thickness of 13 μm.

On the electrophotographic photoreceptor thus obtained, the electrophotographic characteristics and printing impression were evaluated by the same manner as in Example III-1(a). The results are shown in Table 2 below.

COMPARATIVE EXAMPLE III-2(a)

After an undercoating layer and a charge generating layer on a conductive substrate were formed by the same procedure as in example III-1(a), and then a charge transporting layer was formed as follows to form an electrophotographic photoreceptor.

That is, a coating composition prepared by dissolving 4 parts by weight of N,N'-diphenyl-N,N'-bis(3-methylphenyl)-[1,1'-biphenyl]-4,4'-diamine and 6 parts by weight of a polycarbonate resin [bisphenol A type: PC(A)] in 90 parts by weight of monochlorobenzene was coated on the aforesaid charge generating layer by 35 a draw coating method and dried for 90 minutes at 170° C. to form the charge transporting layer having a thickness of 13 μm.

On the electrophotographic photoreceptor thus obtained, the electrophotographic characteristics and printing impression were evaluated by the same manner as in Example III-1(a). The results obtained are shown in Table 2 below.

COMPARATIVE EXAMPLE III-1(b)

After a subbing layer and a charge generating layer on a conductive substrate were formed by the same procedure as in Example III-1(b), and thereafter, a charge transporting layer was formed as follows to provide an electrophotographic photoreceptor.

That is, a coating composition prepared by dissolving 4 parts by weight of N,N'-diphenyl-N,N'-bis(3-methylphenyl)-[1,1'-biphenyl]-4,4'-diamine and 6 parts by weight of a polycarbonate resin [bisphenol Z type: PC(Z)] in 90 parts by weight of monochlorobenzene was coated on the aforesaid charge generating layer by a draw coating method and dried for 90 minutes at 170° C. to provide the charge transporting layer having a thickness of 13 μm.

On the electrophotographic photoreceptor thus obtained, the electrophotographic characteristics and printing impression were evaluated by the same manners as in Example III-1(b). The results are shown in Table 2 below.

COMPARATIVE EXAMPLE III-2(b)

After a subbing layer and a charge generating layer on a conductive substrate were formed by the same procedure as in Example III-1(b), and thereafter, a charge transporting layer was formed as follows to provide an electrophotographic photoreceptor.

That is, a coating composition prepared by dissolving 4 parts by weight of N,N'-diphenyl-N,N'-bis(3-methylphenyl)-[1,1'-biphenyl]-N,N'-diamine and 6 parts by weight of a polycarbonate resin [bisphenol A type: PC(A)] in 90 parts by weight of monochlorobenzene was coated on the aforesaid charge generating layer by a draw coating method and dried for 90 minutes at 170° C. to form the charge transporting layer having a thickness of 13 μm.

On the electrophotographic photoreceptor thus obtained, the electrophotographic characteristics and printing impression were evaluated by the same manners as in Example III-1(b).

The results obtained are shown in Table 2 below.

TABLE 2

|  | $V_{DDP}$ (volt) | VRR (volt) | $E_{\frac{1}{2}}$ (erg/cm²) | Image Defect (at copying 100,000 copies) | Surface Abrasion Amount (μm) (at copying 100,000 copies) |
| --- | --- | --- | --- | --- | --- |
| Example III-1(a) | −520 | −15 | 1.1 | no occurrence | 0.1 |
| Example III-2(a) | −540 | −25 | 1.0 | " | 0.1 |
| Comparative Example III-1(a) | −490 | −10 | 1.2 | Defect was occurred at 25,000 copies | 3.8 |
| Comparative Example III-2(a) | −480 | −20 | 1.1 | Defect was occurred at 20,000 copies | 4.2 |
| Example III-1(b) | −530 | −20 | 0.9 | no occurrence | 0.1 |
| Example III-2(b) | −510 | −15 | 1.1 | " | 0.1 |
| Comparative Example III-1(b) | −490 | −10 | 1.2 | Defect was occurred at 25,000 copies | 3.8 |
| Comparative Example III-2(b) | −480 | −20 | 1.1 | Defect was occurred at 20,000 copies | 4.2 |

As described above, since in the charge transporting layer of the electrophotographic photoreceptor of this invention, the charge transporting agent is stably contained in the matrix of the polycondensation product of a metal alkoxide having high hardness, the electrophotographic photoreceptor of this invention is excellent in durability or printing impression and can give a very large number of copies having excellent image quality without causing image defects in a repeated copying operation for a long period of time. While the invention has been described in detail and with reference to specific embodiments thereof, it will be apparent to one skilled in the art that various changes and modifications can be made therein without departing from the spirit and scope thereof.

What is claimed is:

1. An inorganic-organic or semiconductive inorganic-organic composite material formed by polycondensing a metal alkoxide and an organic compound by a sol-gel process, wherein said metal alkoxide is at least one metal alkoxide selected from a group of metal alkoxides represented by formulae (Ia), (IIa), and (IIIa) or a group of metal alkoxides represented by formulae (Ib), (IIb), and (IIIb) and said organic compound has an affinity with $X_1$ or $X_2$ contained in the metal alkoxides;

-continued

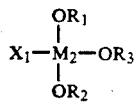 (IIa)

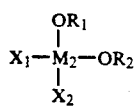 (IIIa)

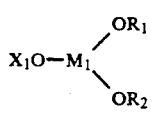 (Ib)

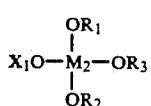 (IIb)

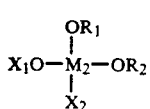 (IIIb)

wherein $M_1$ represents a trivalent metal atom; $M_2$ represents a tetravalent metal atom or a carbon atom; $R_1$, $R_2$, and $R_3$ each represents a hydrogen atom or an alkyl group having from 1 to 6 carbon atoms, provided that at least one of $R_1$, $R_2$, and $R_3$ represents an alkyl group having from 1 to 6 carbon atoms; and $X_1$ and $X_2$ each represents an alkyl group having 5 or more carbon atoms, an aryl group, an aralkyl group, an acyl group, a heterocyclic group, or unsaturated hydrocarbon group, each group may have a substituent, or the $X_1$ and $X_2$ represent groups which are combined with each other to form a ring structure.

2. The inorganic-organic or semiconductive inorganic-organic composite material as in claim 1, wherein said metal alkoxide is a mixture of at least one selected from the group of the metal alkoxides represented by formulae (Ia), (IIa), and (IIIa) or the group of the metal alkoxides represented from formulae (Ib), (IIb), and (IIIb) and at least one selected from a group of metal alkoxides represented from formulae (IV) and (V);

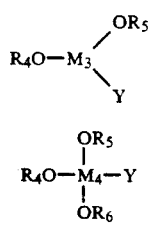 (IV)

(V)

wherein $M_3$ represents a trivalent metal atom; $M_4$ represents a tetravalent metal atom or a carbon atom; $R_4$, $R_5$ and $R_6$ each represents a hydrogen atom or an alkyl group having from 1 to 4 carbon atoms; and Y represents a hydroxy group, an alkoxy group having from 1 to 4 carbon atoms, a halogen atom, an amino group, an alkyl group having from 1 to 4 carbon atoms, which may have a substituent, an aryl group which may have a substituent, an acyl group, a heterocyclic group, or an unsaturated hydrocarbon group.

3. The inorganic-organic or semiconductive inorganic-organic composite material as in claim 1, wherein the metal atom of the metal alkoxide is selected from the group consisting of Al, B, Ga, Y, Fe, Si, Ge, Sn, Ti, and Zr.

4. A process for producing an inorganic-organic or semiconductive inorganic organic composite material by polycondensing a metal alkoxide in the presence of an organic compound by a sol-gel process, which comprises carrying out the polycondensation by adding the organic compound to a sol-solution containing at least one metal alkoxide selected from a group of metal alkoxides represented by formulae (Ia), (IIa), and (IIIa) or a group of metal alkoxides represented by formulae (Ib), (IIb), and (IIIb), said organic compound having an affinity with $X_1$ or $X_2$ contained in said metal alkoxides;

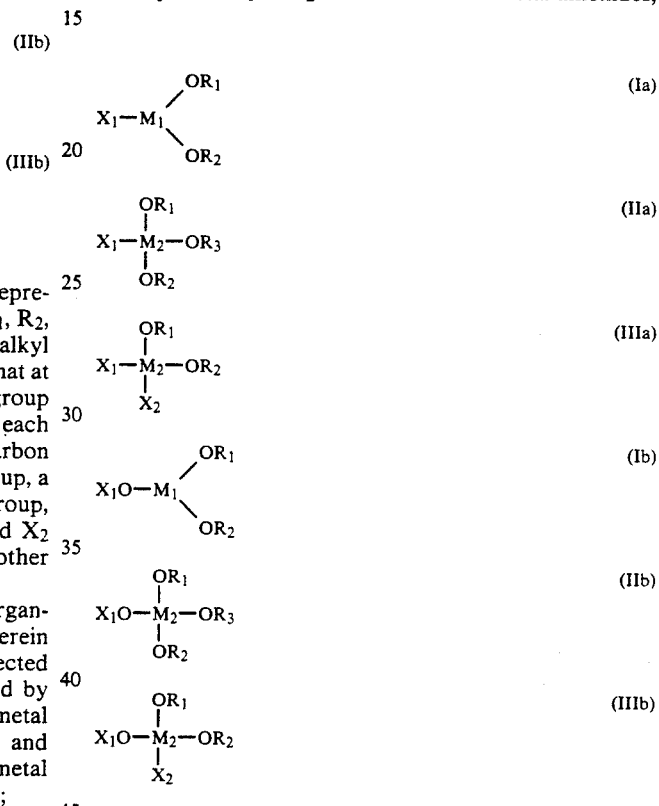

wherein $M_1$ represents a trivalent metal atom; $M_2$ represents a tetravalent metal atom or a carbon atom; $R_1$, $R_2$, and $R_3$ each represents a hydrogen atom or an alkyl group having from 1 to 6 carbon atoms, provided that at least one of $R_1$, $R_2$, and $R_3$ represents an alkyl group having from 1 to 6 carbon atoms; and $X_1$ and $X_2$ each represents an alkyl group having 5 or more carbon atoms, an aryl group, an aralkyl group, an acyl group, a heterocyclic group, an aralkyl group, an acyl group, a heterocyclic group, or an unsaturated hydrocarbon group, each group may have a substituent, or $X_1$ and $X_2$ represent groups which combine with each other to form a ring structure.

5. The process for producing an inorganic-organic or semiconductive inorganic-organic composite material as in claim 4, wherein said sol solution contains at least one metal alkoxide selected from the group of the metal alkoxides represented by formulae (Ia), (IIa), and (IIIa) or the group of the metal alkoxides represented by formulae (Ib), (IIb), and (IIIb) and at least one metal alkoxide selected from a group of metal alkoxides represented by formulae (IV) and (V);

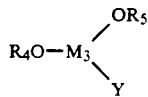 (IV)

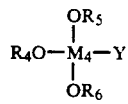 (V)

wherein $M_3$ represents a trivalent metal atom; $M_4$ represents a tetravalent metal atom or a hydrogen atom; $R_4$, $R_5$, and $R_6$ each represents a hydrogen atom or an alkyl group having from 1 to 4 carbon atoms; and Y represents a hydroxy group, an alkoxy group having from 1 to 4 carbon atoms, a halogen atom, an amino group, an alkyl group having from 1 to 4 carbon atoms, which may have a substituent, an aryl group which may have a substituent, an acyl group, a heterocyclic group, or an unsaturated hydrocarbon group.

6. The process of producing an inorganic-organic or semiconductive inorganic-organic composite material as in claim 4, wherein the metal atom of the metal alkoxide is selected from the group consisting of Al, B, Ga, Y, Fe, Si, Ge, Sn, Ti, and Zr.

7. An electrophotographic photoreceptor comprising a conductive substrate having formed thereon a charge generating layer and a charge transporting layer, wherein the charge transporting layer comprising a matrix formed by the polycondensation of at least one metal alkoxide selected from a group of metal alkoxides represented by formulae (Ia), (IIa), and (IIIa) or a group of metal alkoxides represented by formulae (Ib), (IIb), and (IIIb), and an organic compound as a charge transporting agent has an affinity with $X_1$ or $X_2$ contained in the metal alkoxide;

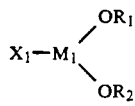 (Ia)

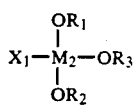 (IIa)

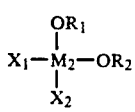 (IIIa)

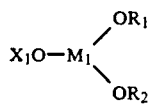 (Ib)

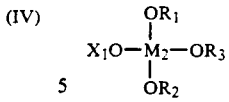 (IIb)

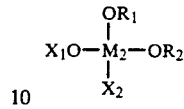 (IIIb)

wherein $M_1$ represents a trivalent metal atom; $M_2$ represents a tetravalent metal atom or a carbon atom; $R_1$, $R_2$, and $R_3$ each represents a hydrogen atom or an alkyl group having from 1 to 6 carbon atoms, provided that at least one of $R_1$, $R_2$, and $R_3$ represents an alkyl group having 6 or more carbon atoms; and $X_1$ and $X_2$ each represents an alkyl group having from 1 to 5 carbon atoms, an aryl group, an aralkyl group, an acyl group, a heterocyclic group, or an unsaturated hydrocarbon group, each group may have a substituent, or $X_1$ and $X_2$ represent groups which combine with each other to form a ring structure.

8. The electrophotographic photoreceptor as in claim 7, wherein the charge transporting layer comprises a matrix formed by the polycondensation of at least one metal alkoxide selected from the group of the metal alkoxides represented by formulae (Ia), (IIa), and (IIIa) or the group of the metal alkoxides represented by formulae (Ib), (IIb), and (IIIb) and at least one metal alkoxide selected from a group of the metal alkoxides represented by formulae (IV) and (V), and an organic compound as a charge transferring material has an affinity with the metal alkoxide;

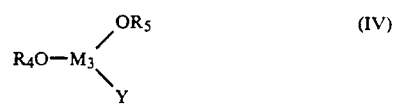 (IV)

 (V)

wherein $M_3$ represents a trivalent metal atom; $M_4$ represents a trivalent metal atom or a carbon atom; $R_4$, $R_5$, and $R_6$ each represents a hydrogen atom or an alkyl group having from 1 to 4 carbon atoms; and Y represents a hydroxy group, an alkoxy group having from 1 to 4 carbon atoms, a halogen atom, an amino group, an alkyl group having from 1 to 4 carbon atoms, which may have a substituent, an aryl group which may have a substituent, an acyl group, a heterocyclic group, or an unsaturated hydrocarbon group.

9. The electrophotographic photoreceptor as in claim 7, wherein the metal atom of the metal alkoxide is selected from the group consisting of Al, B, Ga, Y, Fe, Si, Ge, Sn, Ti, and Zr.

* * * * *

UNITED STATES PATENT AND TRADEMARK OFFICE
CERTIFICATE OF CORRECTION

PATENT NO. : 5,168,024
DATED : December 01, 1992
INVENTOR(S) : Kohichi Yamamoto et al.

It is certified that error appears in the above-identified patent and that said Letters Patent is hereby corrected as shown below:

On the title page, Abstract, line 7 change "other" to read --another--.

Claim 5, Column 35, Line 18 change "1 to 4" to --1 to 4--.

Claim 7, Column 36, Line 17 change "6 or more" to --from 1 to 6--.

Claim 7, Column 36, line 18 change "from 1 to 5" to --5 or more--.

Signed and Sealed this

Fifth Day of April, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,168,024
DATED : December 01, 1992
INVENTOR(S) : Kohichi Yamamoto et al.

It is certified that error appears in the above-indentified patent and that said Letters Patent is hereby corrected as shown below:

TITLE PAGE

Assignee, Front Page change "Corporation" to --Co.--.

Abstract, Front Page, Line 7 change "other" to --another--.

Claim 5, Column 35, Line 18 change "1 to 4" to --1 to 4--.

Claim 7, Column 36, Line 17 change "6 or more" to --from 1 to 6--.

Claim 7, Column 36, line 18 change "from 1 to 5" to --5 or more--.

Signed and Sealed this

Tenth Day of May, 1994

Attest:

BRUCE LEHMAN

*Attesting Officer*     *Commissioner of Patents and Trademarks*